United States Patent
Nakatsugawa et al.

(10) Patent No.: US 7,224,133 B2
(45) Date of Patent: May 29, 2007

(54) CONTROL APPARATUS, DUAL CHIP INVERTER AND SINGLE CHIP INVERTER OF AC MOTORS

(75) Inventors: Junnosuke Nakatsugawa, Hitachi (JP); Tsuyoshi Tanaka, Hitachi (JP); Kenji Sakurai, Hitachi (JP); Tunehiro Endo, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 11/057,615

(22) Filed: Feb. 15, 2005

(65) Prior Publication Data

US 2005/0201129 A1 Sep. 15, 2005

(30) Foreign Application Priority Data

Mar. 12, 2004 (JP) ............................. 2004-069936

(51) Int. Cl.
*H02P 6/10* (2006.01)

(52) U.S. Cl. .................. 318/254; 318/448; 318/722

(58) Field of Classification Search ................ 318/138, 318/254, 439, 720–724, 448, 611, 629
See application file for complete search history.

(56) References Cited

U.S. PATENT DOCUMENTS

| 5,280,228 | A | * | 1/1994 | Kanouda et al. ............ 318/803 |
| 5,313,150 | A | * | 5/1994 | Arakawa et al. ............ 318/768 |
| 5,327,064 | A | * | 7/1994 | Arakawa et al. ............ 318/801 |
| 5,334,923 | A | * | 8/1994 | Lorenz et al. .............. 318/805 |
| 5,428,283 | A | * | 6/1995 | Kalman et al. ............. 318/729 |
| 6,118,239 | A | * | 9/2000 | Kadah ....................... 318/268 |
| 6,828,752 | B2 | * | 12/2004 | Nakatsugawa et al. ..... 318/801 |

FOREIGN PATENT DOCUMENTS

| JP | 9-215375 | 8/1997 |
| JP | 2001-45787 | 2/2001 |
| JP | 2001-251886 | 9/2001 |
| JP | 2004-120841 | 4/2004 |

* cited by examiner

*Primary Examiner*—Bentsu Ro
(74) *Attorney, Agent, or Firm*—McDermott Will & Emery LLP

(57) ABSTRACT

A control apparatus and a semiconductor apparatus of AC motors capable of reducing torque ripple with a comparatively simple circuit corresponding to a high withstand voltage and capable of driving a motor at high efficiency even when the rotational speed or load has changed. The control apparatus detects first phase signals fixed in relative phase to induced voltages of the motor and current polarity signals, recognizes phase differences between them, generates second phase signals so as to make the phase differences approach zero to drive the motor at high efficiency, generates modulation wave signals having quasi-sinusoidal waveforms or trapezoidal waveforms on the basis of the second phase signals, compares the modulation wave signals with a carrier wave signal, and conducts PWM control on an inverter.

9 Claims, 18 Drawing Sheets

(a) U-PHASE 1ST PHASE SIGNAL hu
(b) V-PHASE 1ST PHASE SIGNAL hv
(c) W-PHASE 1ST PHASE SIGNAL hw
(d) U-PHASE CURRENT POLARITY SIGNAL Ipu
(e) V-PHASE CURRENT POLARITY SIGNAL Ipv
(f) W-PHASE CURRENT POLARITY SIGNAL Ipw

INDUCED VOLTAGE
MOTOR CURRENT (a) U-PHASE 1ST PHASE SIGNAL hu
(b) U-PHASE CURRENT POLARITY SIGNAL Ipu
(c) PHASE DIFFERENCE SIGNAL Au
(d) LEAD/LAG SIGNAL Bu
(e) U-PHASE PHASE DIFFERENCE RECOGNITION SIGNAL Du
(f) TOTAL SUM F OF PHASE DIFFERENCE RECOGNITION SIGNALS OF PHASES
(g) PHASE DIFFERENCE SIGNAL VC_lag (a) U-PHASE NEW 1ST PHASE SIGNAL hu1
(b) V-PHASE NEW 1ST PHASE SIGNAL hv1
(c) W-PHASE NEW 1ST PHASE SIGNAL hw1
(d) U-PHASE MASK SIGNAL Nu
(e) V-PHASE MASK SIGNAL Nv
(f) W-PHASE MASK SIGNAL Nw
(g) CHARGE & DISCHARGE SIGNAL G
(h) SLOPE SIGNAL SS

[CASE 1: WHEN PHASE LEADS]
(i) U-PHASE SLOPE SIGNAL Su
(j) U-PHASE 2ND PHASE SIGNAL hsu

[CASE 2: WHEN PHASE DOES NOT LEAD]
(k) SLOPE SIGNAL Su
(l) U-PHASE 2ND PHASE SIGNAL hsu

※ PHASE LEADS

※ PHASE DOES NOT LEAD

※ PHASE LEADS (a) U-PHASE 2ND PHASE SIGNAL hsu (b) V-PHASE 2ND PHASE SIGNAL hsv (c) W-PHASE 2ND PHASE SIGNAL hsw (d) U-PHASE TRAPEZOIDAL WAVE SIGNAL tru (e) V-PHASE TRAPEZOIDAL WAVE SIGNAL trv (f) W-PHASE TRAPEZOIDAL WAVE SIGNAL trw (g) U-PHASE QUASI-SINUSOIDAL WAVE SIGNAL mu (h) V-PHASE QUASI-SINUSOIDAL WAVE SIGNAL mv (i) W-PHASE QUASI-SINUSOIDAL WAVE SIGNAL mw

TWO CONSTANT LEVELS IN ONE PERIOD

FOUR CONSTANT LEVELS IN ONE PERIOD

FIG.22

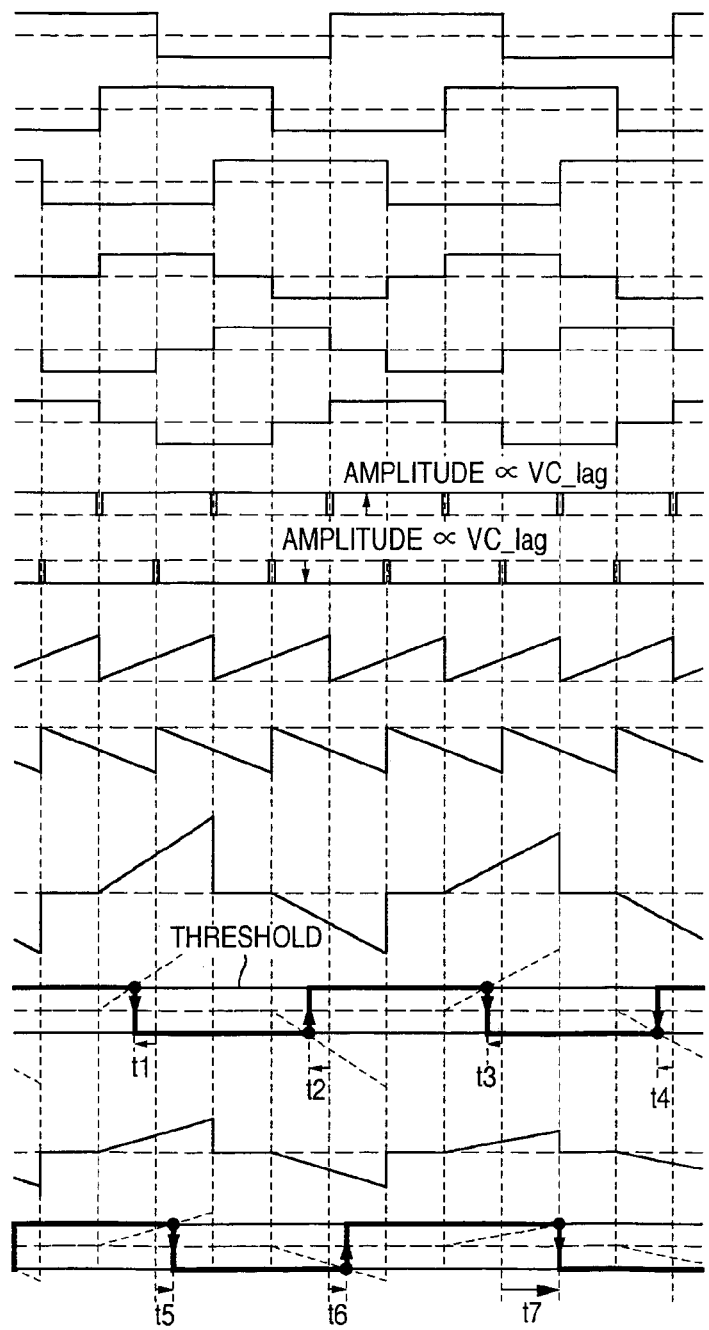

(a) U-PHASE NEW 1ST PHASE SIGNAL hu1
(b) V-PHASE NEW 1ST PHASE SIGNAL hv1
(c) W-PHASE NEW 1ST PHASE SIGNAL hw1

(d) U-PHASE MASK SIGNAL Nu
(e) V-PHASE MASK SIGNAL Nv
(f) W-PHASE MASK SIGNAL Nw (g) CHARGE & DISCHARGE SIGNAL G1
(h) CHARGE & DISCHARGE SIGNAL G2

(i) POSITIVE SLOPE SIGNAL SS1
(j) NEGATIVE SLOPE SIGNAL SS2

[CASE 1: WHEN PHASE LEADS]
(k) U-PHASE SLOPE SIGNAL Su
(l) U-PHASE 2ND PHASE SIGNAL hsu

[CASE 2: WHEN PHASE LAGS]
(m) SLOPE SIGNAL Su
(n) U-PHASE 2ND PHASE SIGNAL hsu

CONTROL APPARATUS, DUAL CHIP INVERTER AND SINGLE CHIP INVERTER OF AC MOTORS

BACKGROUND OF THE INVENTION

The present invention relates to a control apparatus, a dual chip inverter and a single chip inverter for driving AC motors.

In recent years, a method for inverter-driving AC motors, particularly permanent magnet synchronous motors is spread. In the field of home electronic equipment, price competition has grown more intense and it is desired to provide inexpensive inverter drive apparatuses. In drive apparatuses for permanent magnet synchronous motors, therefore, the 120 degree energization scheme in which the circuit configuration is simple and the motor efficiency can be made comparatively high is used.

In the motor drive apparatus using the 120 degree energization scheme, magnetic pole positions of a rotor in a motor are detected by a magnetic pole position detector. At timing when the rotor magnetic flux become perpendicular to magnetic poles of a stator, switching elements of an inverter apparatus are controlled to turn on/off. As a result, currents flow through two windings among three-phase windings to drive the motor.

As for this 120 degree energization scheme, it is known that torque ripple occurs at the time of switching operation (commutation) in the energized winding, resulting in undesired sounds.

If the motor current waveform contains lots of harmonic components, typically ripple is apt to occur in the motor torque. Since the motor torque is proportional to the product of the induced voltage unique to the motor and the motor current, the motor torque greatly depends on the motor current waveform. This torque ripple vibrates the motor itself, and vibrates a frame on which the motor is mounted. This vibration causes undesired sounds.

As a method for reducing undesired sounds, there is a method of making the motor drive current sinusoidal by using the so-called PWM (Pulse Width Modulation) control. Specifically, a modulation wave signal having a sinusoidal waveform depending upon the position of the rotor is generated and compared with a carrier wave to generate a PWM signal and output a PWM voltage from the inverter. In order to generate the modulation wave signal having a sinusoidal waveform depending upon the position of the rotor, a microcomputer is used to utilize a PWM timer incorporated therein. As compared with the 120 degree energization scheme, however, the apparatus becomes complicated and expensive.

On the other hand, as a method for implementing a motor drive circuit having a comparatively simple circuit configuration and generating low undesired sounds, there is a method of using an analog circuit to generate a modulation signal having a sinusoidal waveform, smoothing a three-level modulation waveform with a filter circuit, and thereby smoothing a current waveform to reduce undesired sounds emitted from the motor (see, for example, JP-A-2001-251886).

On the other hand, for driving a motor at high efficiency, it is desired to conduct optimum control on phase relations of voltages, currents and induced voltages in the motor according to the rotational speed or the load.

As for this, there is a method of setting an angle of lead time proportionate to the rotational speed of the motor and making the voltage phase lead according to the rotational speed by using an analog circuit (see, for example, JP-A-2001-45787).

Furthermore, there is a method of controlling the phase of the motor voltage according to the load, and squaring the phase of an induced voltage generated in each phase coil with that of the phase current of the phase (see, for example, JP-A-9-215375).

SUMMARY OF THE INVENTION

In the method disclosed in JP-A-2001-251886, the modulation waveform still contains lots of distortion components. Therefore, the method is considered to be insufficient for undesired sound reduction. Furthermore, the voltage phase of the motor is in synchronism with a rotor position detection signal of the motor. Therefore, it is considered that highly efficient control cannot be conducted for a load change.

In the method disclosed in JP-A-2001-45787, the motor can be driven at high efficiency when the rotational speed has changed under a certain load condition. However, it is considered that highly efficient control cannot be conducted when the load condition has changed.

In the method disclosed in JP-A-9-215375, voltage rate data having a sinusoidal waveform are previously stored in a ROM and the voltage phase of the motor is generated in a digital circuit. Therefore, it is considered that the control part is different in withstand voltage from power elements and both of them cannot be conveniently mounted on the same chip.

In view of these points, the present invention has been achieved. An object of the present invention is to provide a control apparatus and a semiconductor apparatus of AC motors, capable of reducing the torque ripple with a comparatively simple circuit corresponding to a high withstand voltage and driving the motor at high efficiency even when the rotational speed or the load has changed.

In accordance with one aspect of the present invention, a control apparatus of AC motors includes a second phase signal controller for generating second phase signals so as to make phase differences between first phase signals generated by a first phase signal generator and current polarity signals of an AC motor driven by an inverter generated by a current polarity detector approach zero, on the basis of the phase differences and a command signal depending upon a rotational speed of the AC motor; a modulation wave generator for generating a plurality of modulation wave signals on the basis of the command signal depending upon the rotational speed of the AC motor and the second phase signals; and a pulse width modulator for comparing the modulation wave signals with a carrier wave signal and thereby conducting pulse width modulation control on the inverter.

According to the present invention, it becomes possible to provide a control apparatus, a dual chip inverter and a single chip inverter of AC motors, capable of driving motors at high efficiency by synchronizing the induced voltage of the motor with the current phase with a comparatively simple circuit.

Other objects, features and advantages of the invention will become apparent from the following description of the embodiments of the invention taken in conjunction with the accompanying drawings.

BRIEF DESCRIPTION OF THE DRAWINGS

FIG. 22 is a diagram of operation waveforms of a second phase signal generator in a third embodiment;

DESCRIPTION OF THE EMBODIMENTS

First Embodiment

A first embodiment of the present invention will now be described with reference to FIGS. 1 to 14.

Figure 1:
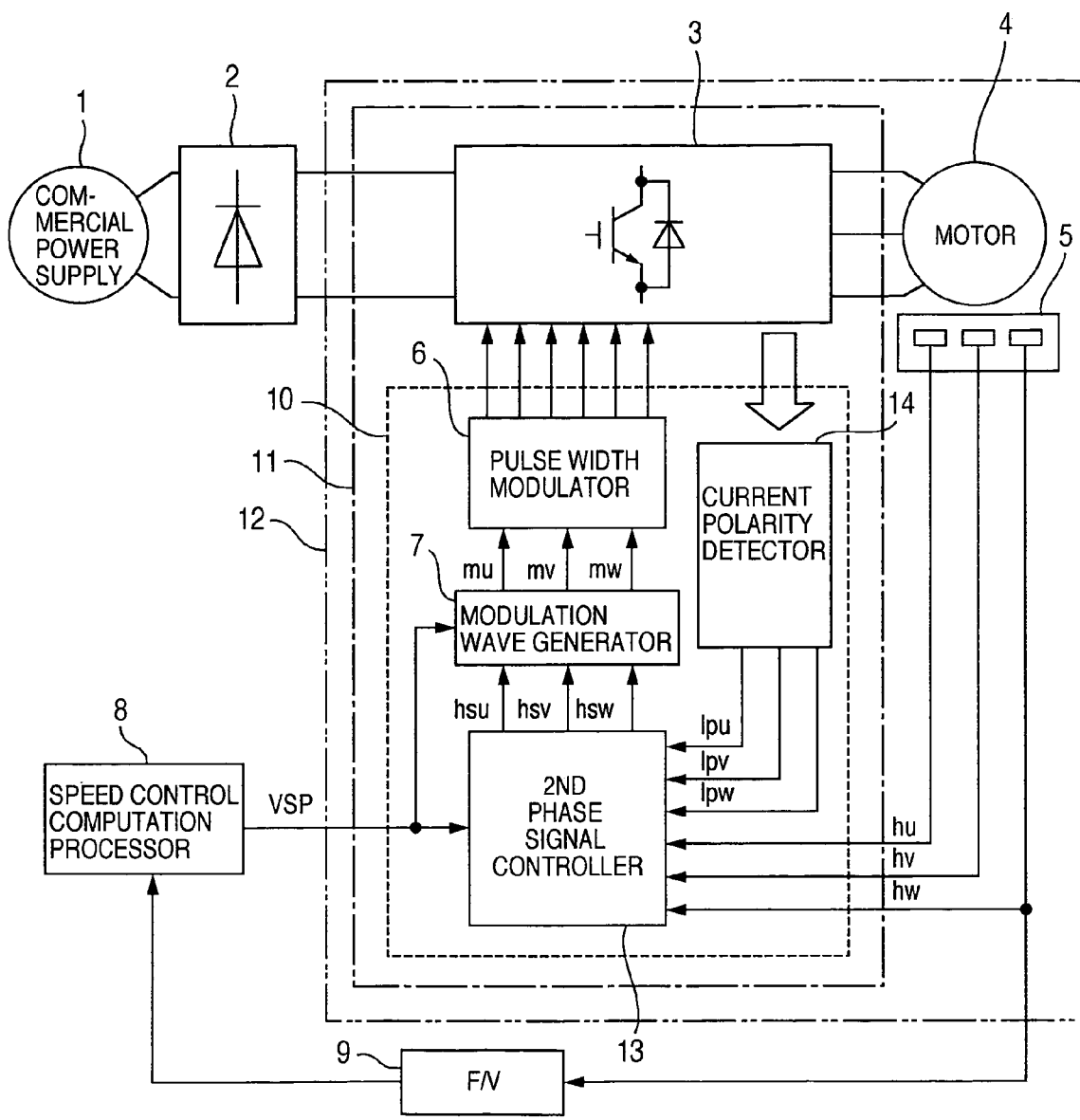
FIG. 1 is a configuration diagram of a first embodiment according to the present invention.

In FIG. 1, reference numeral 1 denotes a commercial power supply, 2 a rectifier circuit, 11 a single chip inverter including a monolithic IC, 4 a three-phase permanent magnet synchronous motor (hereafter abbreviated to motor), 8 a speed control computation processing unit, and 9 an F/V converter (frequency-voltage converter). The single chip inverter 11 includes an inverter 3 and a control circuit 10. The control circuit 10 includes a pulse width modulator 6, a modulation wave generator 7, a second phase signal controller 13, and a current polarity detector 14.

The rectifier circuit 2 is connected to the commercial power supply 1. A DC voltage is supplied to the inverter 3 via the rectifier circuit 2. An AC voltage having a variable voltage and a variable frequency is supplied to the motor 4 by the inverter 3.

The motor 4 is an AC motor having a permanent magnet in its rotor. The motor 4 includes a first phase signal generator 5 to detect the magnetic flux generated by the permanent magnet and detect magnetic pole positions of the rotor. The first phase signal generator 5 is a magnetic pole detector including three hole ICs associated with respective phases. The first phase signal generator is disposed so as to have a phase difference of 120 degrees in electrical angle between phases. The first phase signal generator 5 outputs first phase signals hu, hv and hw which are logic signals.

The single chip inverter 11 is mounted on a casing of the motor 4. The single chip inverter 11 constitutes a motor 12 incorporating a drive circuit in conjunction with the motor 4 and the first phase signal generator 5.

The first phase signals hu, hv and hw have information of the rotational speed of the motor (such as the period of a pulse signal). Therefore, the first phase signal hw is input to the F/V converter 9, and the F/V converter 9 outputs a speed voltage signal corresponding to the actual speed. Here, hu or hv may be used instead of the first phase signal hw, or a plurality of signals among the first phase signals hu, hv and hw may be used.

A speed voltage signal output from the F/V converter 9 is input to the speed control computation processor 8. The speed voltage signal is compared with a speed command set in the speed control computation processor 8. A control signal VSP is output from the speed control computation processing unit 8 so as to make a deviation between them equal to approximately zero. The control signal VSP is input to the modulation wave generator 7 and the second phase signal controller 13.

The current polarity detector 14 outputs current polarity signals Ipu, Ipv and Ipw, which are logic signals, on the basis of current polarity information obtained from the inverter 3.

Figure 2:
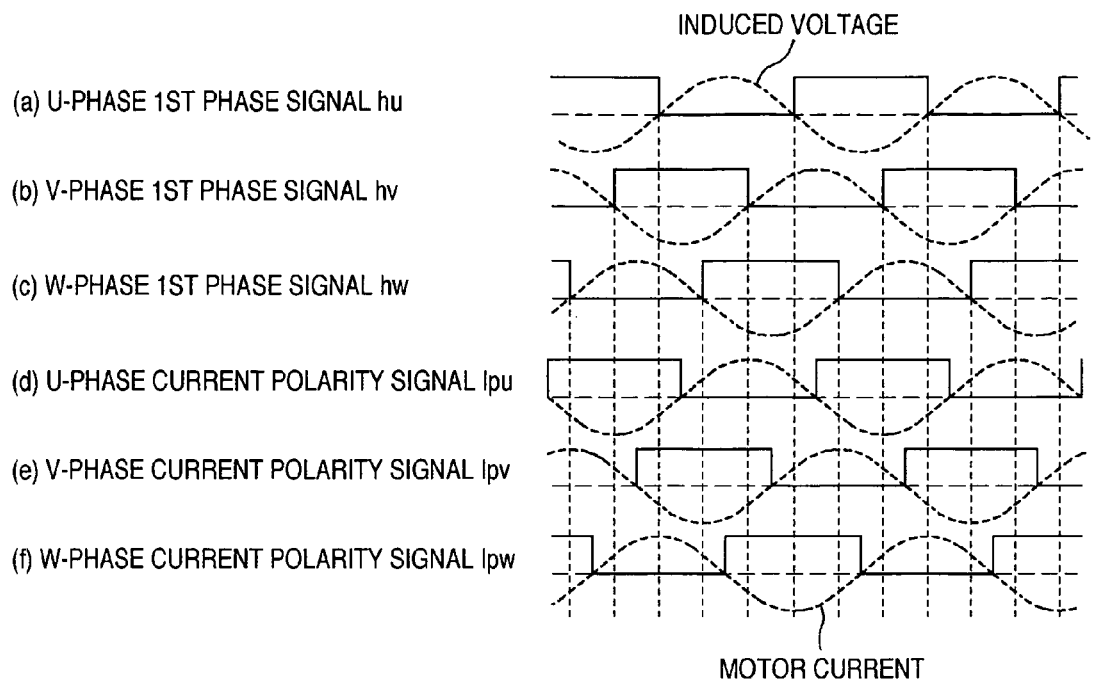
FIG. 2 is a diagram showing phase relations between first phase signals and current polarity signals in respective phases.

FIG. 2 shows phase relations between first phase signals and current polarity signals in respective phases. In the present embodiment, each of rising edges of a first phase signal in each phase coincides with a zero crosspoint at which induced voltage of the phase crosses zero volt from positive voltages toward negative voltages, and each of falling edges of the first phase signal in each phase coincides with a zero crosspoint at which induced voltage of the phase crosses zero volt from negative voltages toward positive voltages, as shown in FIGS. 2(a) to (c). On the other hand, as shown in FIGS. 2(d) to (f), each of rising edges of a current polarity signal in each phase coincides with a zero crosspoint at which a motor current of the phase crosses zero volt from positive voltages toward negative voltages, and each of falling edges of the current polarity signal in each phase coincides with a zero crosspoint at which the motor current of the phase crosses zero volt from negative voltages toward positive voltages.

The first phase signals hu, hv and hw, the current polarity signals Ipu, Ipv and Ipw, and the control signal VSP are input to the second phase signal controller 13. On the basis of these signals, the second phase signal controller 13 outputs second phase signals hsu, hsv and hsw.

The second phase signals hsu, hsv and hsw and the control signal VSP are input to the modulation wave generator 7. On the basis of these signals, the modulation wave generator 7 outputs three-phase modulation wave signals mu, mv and mw.

In addition, the pulse width modulator 6 is supplied with the modulation wave signals mu, mv and mw. The pulse width modulator 6 compares the modulation wave signals mu, mv and mw with a carrier wave signal generated therein, and outputs PWM signals to six switching elements included in the inverter 3.

The inverter 3 included in the single chip inverter 11 is, for example, a circuit including a combination of six switching elements such as power MOSFETs or insulated gate bipolar transistors (IGBTs). The switching elements are controlled to turn on or off according to the pulse width modulator 6.

The reason why the control signal VSP is input to the second phase signal controller 13 is that the information concerning the rotational speed of the motor should be reflected into control of the second phase signals, i.e., control of the voltage phases. Here, the control signal VSP is a speed control voltage command for controlling the rotational speed of the motor, and the control signal VSP has rotational speed information of the motor. When the rotational speed information is not necessary for the voltage phase control, such as when the motor is run at a constant rotational speed, therefore, the control signal VSP may not be input to the second phase signal controller 13.

Figure 3:
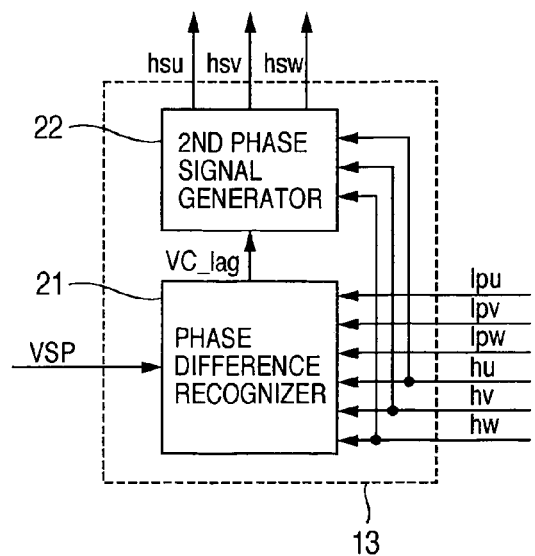
FIG. 3 is a configuration diagram of a second phase signal controller in a first embodiment.

An internal configuration of the second phase signal controller 13 in the first embodiment will now be described with reference to FIG. 3. FIG. 3 shows the configuration of the second phase signal controller 13. The second phase signal controller 13 includes a phase difference recognizer 21 and a second phase signal generator 22. The phase difference recognizer 21 is supplied with the control signal VSP, the first phase signals hu, hv and hw, and the current polarity signals Ipu, Ipv and Ipw. The phase difference recognizer 21 recognizes magnitudes of phase deviations between the first phase signals and the current polarity signals, relations of lead/lag, and the rotational speed information of the motor, and outputs a phase difference signal VC_lag. The second phase signal generator 22 is supplied with the first phase signals hu, hv and hw, and the phase difference signal VC_lag. The second phase signal generator 22 outputs the second phase signals hsu, hsv and hsw having the same phases as the first phase signals or having leading phases as compared with the first phase signals.

In the present embodiment, the control signal VSP is input to the phase difference recognizer 21. When the rotational speed information is not necessary for the voltage phase control, such as when the motor is run at a constant rotational speed, however, the control signal VSP may not be input to the phase difference recognizer 21.

An internal configuration of the phase difference recognizer 21 in the first embodiment will now be described with reference to FIGS. 4 and 5.

Figure 4:
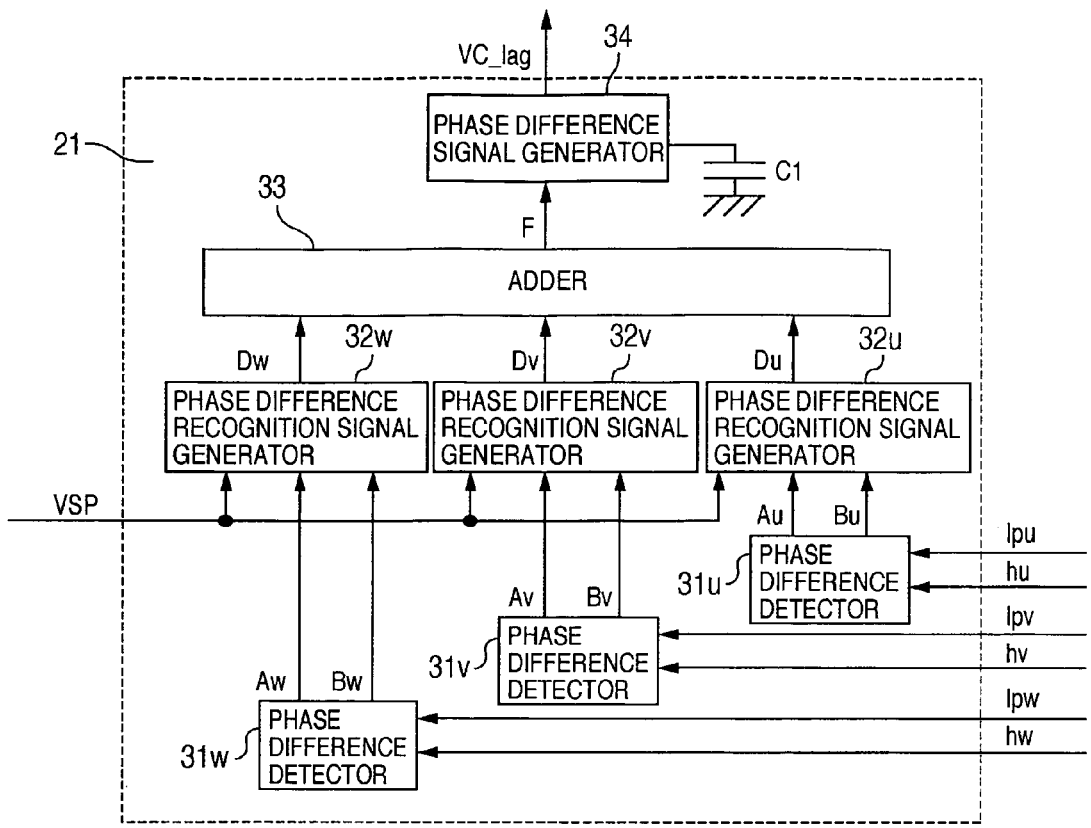
FIG. 4 is a configuration diagram of a phase difference recognizer in a first embodiment.
Figure 5:
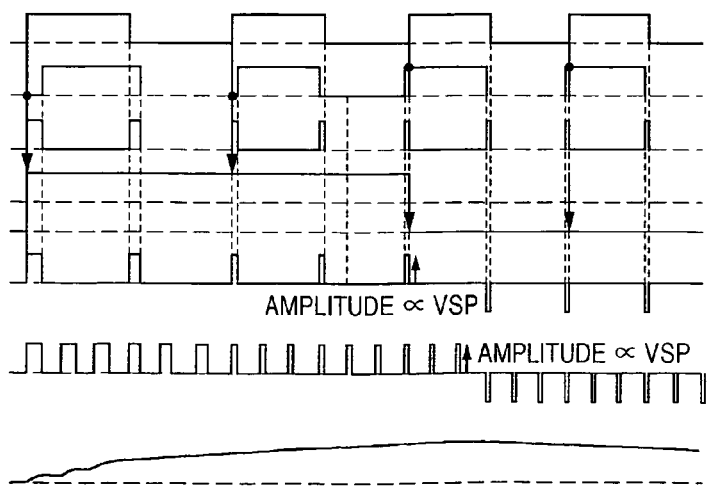
FIG. 5 is a diagram showing an example of operation waveforms of a phase recognizer in a first embodiment.

FIG. 4 shows a configuration of the phase difference recognizer 21. FIG. 5 shows an example of operation waveforms in the phase difference recognizer 21.

The phase difference recognizer 21 includes phase difference detectors 31u, 31v and 31w, phase difference recognition signal generators 32u, 32v and 32w, an adder 33, a phase difference signal generator 34, and a capacitor C1.

The first phase signals hu, hv and hw, and the current polarity signals Ipu, Ipv and Ipw are input to the phase difference detectors 31u, 31v and 31w of respective phases, respectively. The phase difference detectors 31u, 31v and 31w output phase deviation signals Au, Av and Aw, and lead/lag signals Bu, By and Bw, respectively. Each of the phase deviation signals has a positive value only over a time period of occurrence of a phase deviation between the first phase signal and the current polarity signal in each phase. For example, as shown in FIG. 5(a) to (c), the time period over which the phase deviation signal Au has a positive value becomes long as the phase difference between the first phase signal hu and the current polarity signal Ipu become great.

On the other hand, the lead/lag signal maintains a value obtained by inverting a current polarity signal obtained at the time of a rising edge of a first phase signal, until the next rising edge of the first phase signal. For example, when the phase of the current polarity signal Ipu lags behind the phase of the first phase signal hu, the lead/lag signal Bu has a positive value as shown in FIG. 5(d). On the contrary, when the phase of the current polarity signal Ipu leads the phase of the first phase signal hu, the lead/lag signal Bu has a negative value.

The phase deviation signals Au, Av and Aw, the lead/lag signals Bu, By and Bw, and the control signal VSP are input to the phase difference recognition signal generators 32u, 32v and 32w, respectively. The phase difference recognition signal generators 32u, 32v and 32w output phase difference recognition signals Du, Dv and Dw each having an amplitude proportionate to the control signal VSP.

The phase difference recognition signals Du, Dv and Dw are input to the adder 33. The adder 33 outputs the sum total F of the phase difference recognition signals of the phases. The sum total F of the phase difference recognition signals of the phases is proportionate in amplitude to the control signal VSP.

The sum total F of the phase difference recognition signals of the phases is input to the phase difference signal generator 34. The phase difference signal generator 34 integrates the sum total F by charging and discharging the capacitor C1 connected to the phase difference signal generator 34 from a constant current source (not illustrated) in the phase difference signal generator 34 on the basis of the sum total F of the phase difference recognition signals of the phases. Thus, the phase difference signal generator 34 outputs the phase difference signal VC_lag. The phase difference signal VC_lag thus generated has information of the phase difference between the first phase signal and the current polarity signal and the rotational speed information of the motor.

In the present embodiment, the control signal VSP is input to the phase difference recognition signal generators 32u, 32v and 32w. However, it suffices to finally reflect the rotational speed information of the motor into the phase difference signal VC_lag. Therefore, the control signal VSP may be input to the phase difference detectors 31u, 31v and 31w of the phases, the adder 33, or the phase difference signal generator 34, instead of the phase difference recognition signal generators 32u, 32v and 32w.

When the rotational speed information is not necessary for the voltage phase control, such as when the motor is run at a constant rotational speed, however, the control signal VSP may not be input to any of components shown in FIG. 4.

In the present embodiment, the phase difference recognition signals Du, Dv and Dw of respective phases are generated, and the phase difference signal is generated by finding the total sum of them. However, the phase difference signal may be generated by using only any one of the phase difference recognition signals Du, Dv and Dw, or the phase difference signal may be generated by using any two of the phase difference recognition signals Du, Dv and Dw. In that case, the first phase signal and the current polarity signal of the phase that is not used need not be input to the phase difference recognizer 21, and the phase difference detector and the phase difference recognition signal generator of the phase that is not used can be removed.

An internal configuration of the second phase signal generator 22 in the first embodiment will now be described with reference to FIGS. 6 and 7.

Figure 6:
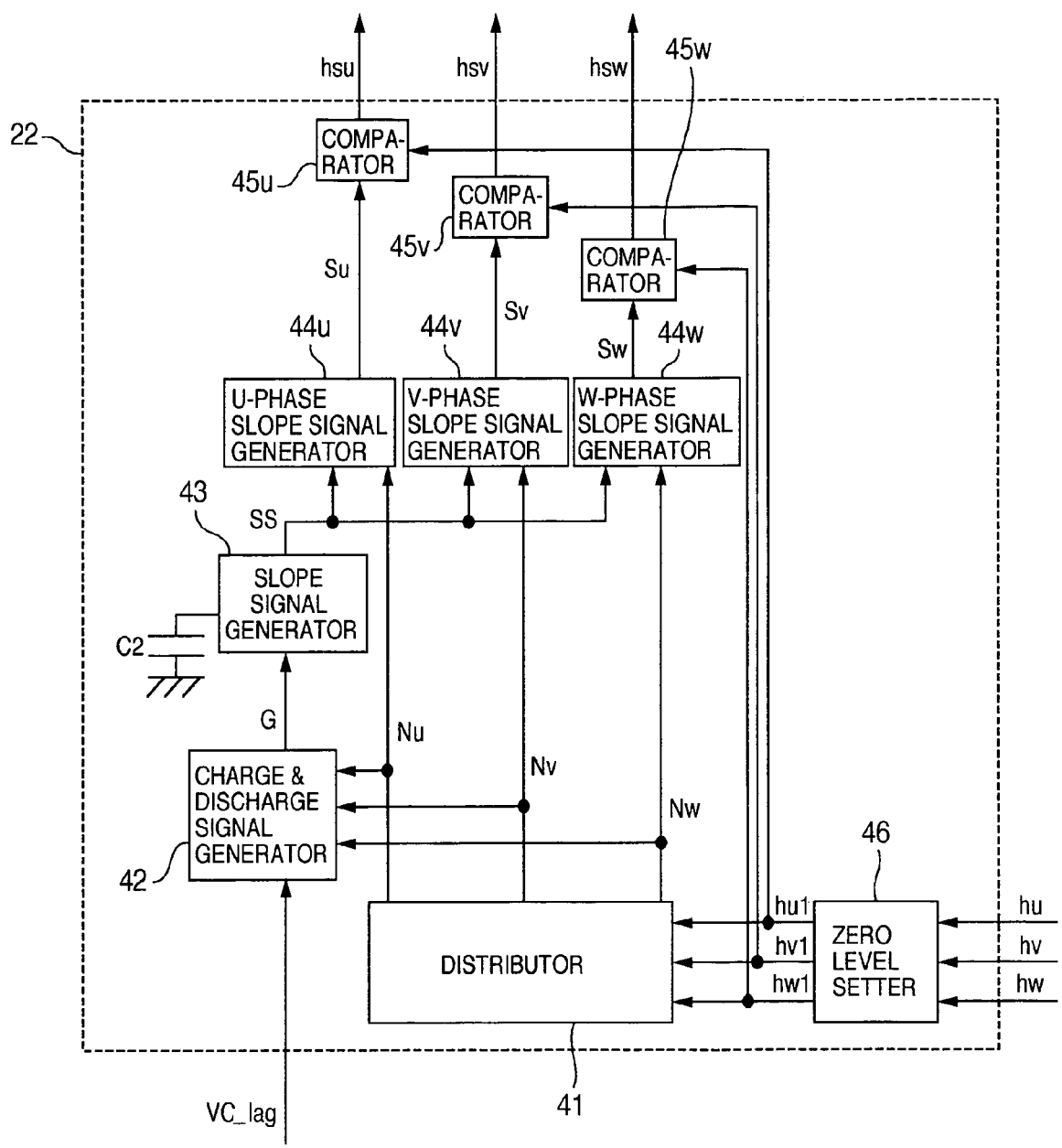
FIG. 6 is a configuration diagram of a second phase signal generator in a first embodiment.
Figure 7:
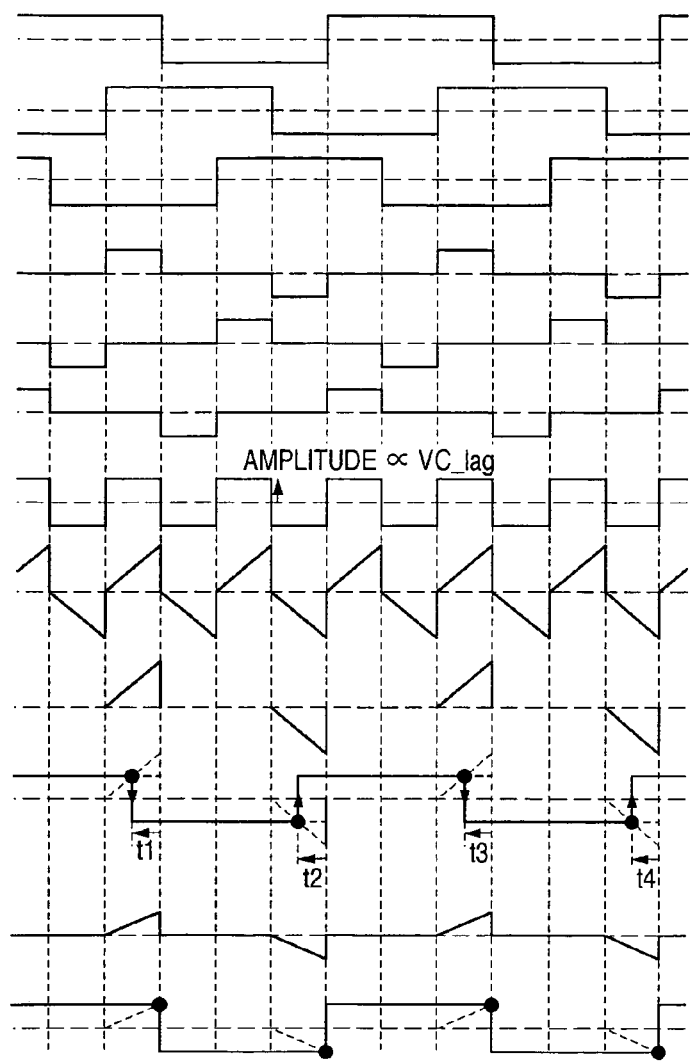
FIG. 7 is a diagram showing an example of operation waveforms of a second phase signal generator in a first embodiment.

FIG. 6 exemplifies a configuration of the second phase signal generator 22. FIG. 7 shows an example of operation waveforms of the second phase signal generator 22.

The second phase signal generator 22 includes a distributor 41, a charge & discharge signal generator 42, a slope signal generator 43, a capacitor C2, slope signal generators 44u, 44v and 44w of respective phases, comparators 45u, 45v and 45w, and a zero level setter 46.

The first phase signals hu, hv and hw are input to the zero level setter 46. As shown in FIG. 7(a) to (c), the zero level setter 46 outputs new first phase signals hu1, hv1 and hw1.

The new first phase signals hu1, hv1 and hw1 are input to the distributor 41. An adder (not illustrated) in the distributor 41 outputs mask signals Nu, Nv and Nw shown in FIGS. 7(d) to (f) on the basis of following relational expressions.

$$Nu = hu1 + hv1$$

$$Nv = hv1 + hw1$$

$$Nw = hw1 + hu1$$

The mask signals Nu, Nv and Nw and the phase difference signal VC_lag output from the phase difference recognizer 21 are input to the charge & discharge signal generator 42. An adder (not illustrated) in the charge & discharge signal generator 42 finds a total sum of the mask signals Nu, Nv and Nw. The charge & discharge signal generator 42 generates a signal having an electrical angle period of 60 degrees, a square waveform and an amplitude proportionate to VC_lag, and outputs a charge & discharge signal G shown in FIG. 7(g).

The charge & discharge signal G is input to the slope signal generator 43. The capacitor C2 connected to the slope signal generator 43 is charged and discharged from a constant current source (not illustrated) in the slope signal generator 43 on the basis of the charge & discharge signal G. The charge & discharge signal G is thus integrated to generate slope portions of a slope signal SS having a gradient proportionate to the phase difference signal VC_lag shown in FIG. 7(h). On the other hand, charges across the capacitor C2 are discharged to a zero level instantaneously when the charge & discharge signal G switches from positive values to negative values or from negative values to positive values. As a result, the next slope begins with the zero level.

The slope signal SS and the mask signals Nu, Nv and Nw are input to the slope signal generators 44u, 44v and 44w of respective phases. The slope signal generators 44u, 44v and 44w output slope signals Su, Sv and Sw of respective phases by masking the slope signal SS while the mask signals Nu, Nv and Nw of respective phases are at the zero level, respectively.

The slope signals Su, Sv and Sw and the new first phase signals hu1, hv1 and hw1 of respective phases are input to the comparators 45u, 45v and 45w of respective phases, respectively. The comparators 45u, 45v and 45w output the second phase signals hsu, hsv and hsw, respectively.

By taking the U phase as an example, operation conducted when a second phase signal leads in phase a first phase signal (case 1) and operation conducted when the second phase signal does not lead in phase the first phase signal (case 2) will now be described.

If the U-phase new first phase signal and the U-phase slope signal have waveforms as shown in FIGS. 7(a) and (i), superposition of the U-phase slope signal yields a waveform as represented by a broken line in FIG. 7(j) and intersections indicated by black circles. If the new first phase signal is inverted at the intersection, a second phase signal as represented by a solid line in FIG. 7(j) is generated and the second phase signal can be made to lead in phase the new first phase signal as indicated by t1 to t4. In other words, in the present embodiment, the new first phase signal of each phase is used as a threshold of the slope signal of the phase.

On the other hand, If the U-phase new first phase signal and the U-phase slope signal have waveforms as shown in FIGS. 7(a) and (k), superposition of the U-phase slope signal yields a waveform as represented by a broken line in FIG. 7(l) and intersections indicated by black circles. Since these intersections coincide with phases at which the new first phase signal is inverted, the second phase signal coincides with the new first phase signal and the phase of the second phase signal does not lead.

According to the present embodiment, each of the second phase signals can be made to lead the first phase signal of the phase by an electrical angle in the range of approximately 0 to 60 degrees as heretofore described.

The reason why the control signal VSP is input to the second phase signal controller 13 is that the information of the control signal VSP should be reflected in the slope signals Su, Sv and Sw of respective phases. The reason will now be described.

Figure 8A:
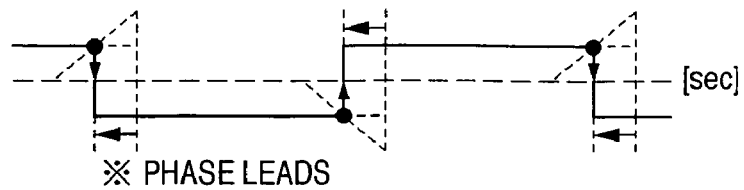
FIGS. 8A to 8C are diagrams showing examples of operation waveforms of a second phase signal generator obtained when a rotational speed has changed in a first embodiment.
Figure 8B:
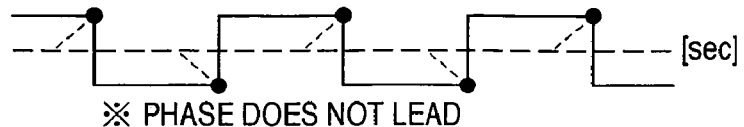
Figure 8C:
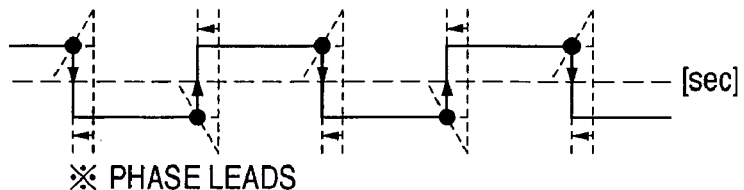

As described earlier, the control signal VSP is a speed control voltage command for controlling the rotational speed of the motor, and the control signal VSP has rotational speed information of the motor. FIGS. 8A to 8C show examples of operation waveforms of the second phase signal generator 22 obtained when the rotational speed has changed. Broken lines represent U-phase new first phase signal and the U-phase slope signal. Solid lines represent the U-phase second phase signal.

It is now supposed that the U-phase slope signal intersects the threshold formed by the U-phase new first phase signal at a certain rotational speed and the phase can be made to lead as shown in FIG. 8A. It is further supposed that the rotational speed has suddenly increased to, for example, twice. If at this time the information of the control signal VSP is not reflected into the slope signals Su, Sv and Sw of respective phases, the gradient of the slopes is the same as that in FIG. 8A and the phase cannot be rapidly made to lead. The phase can be rapidly made to lead by reflecting the information of the control signal VSP into the slope signals Su, Sv and Sw of respective phases and instantaneously changing the gradient of the slopes according to the rotational speed. In the present embodiment, the control signal VSP is used as the rotational speed information.

A signal having rotational speed information may be generated on the basis of a pulse signal period of the first phase signals hu, hv and hw and used as the rotational speed information instead of the control signal VSP.

The modulation wave generator 7 will now be described with reference to FIG. 9.

Figure 9:
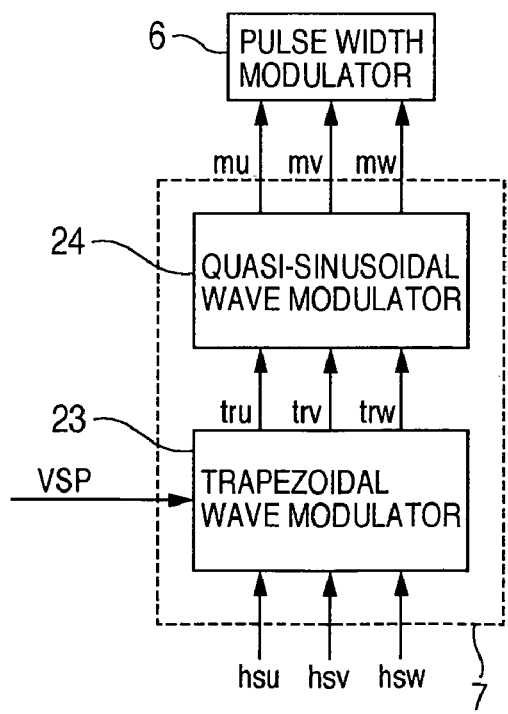
FIG. 9 is a configuration diagram of a modulation wave generator.

FIG. 9 shows a configuration of the modulation wave generator 7. The modulation wave generator 7 includes a trapezoidal wave modulator 23 and a quasi-sinusoidal wave modulator 24.

The control signal VSP and the second phase signals hsu, hsv and hsw are input to the trapezoidal wave modulator 23. On the basis of these signals, the trapezoidal wave modulator 23 generates three-phase trapezoidal wave signals tru, trv and trw each having two constant levels. In the present embodiment, the time period having a constant level begins with an electrical angle of 30 degrees.

The quasi-sinusoidal wave modulator 24 is supplied with the trapezoidal wave signals tru, trv and trw to generate the three-phase quasi-sinusoidal wave signals mu, mv and mw serving as second modulation wave signals.

Figure 10:
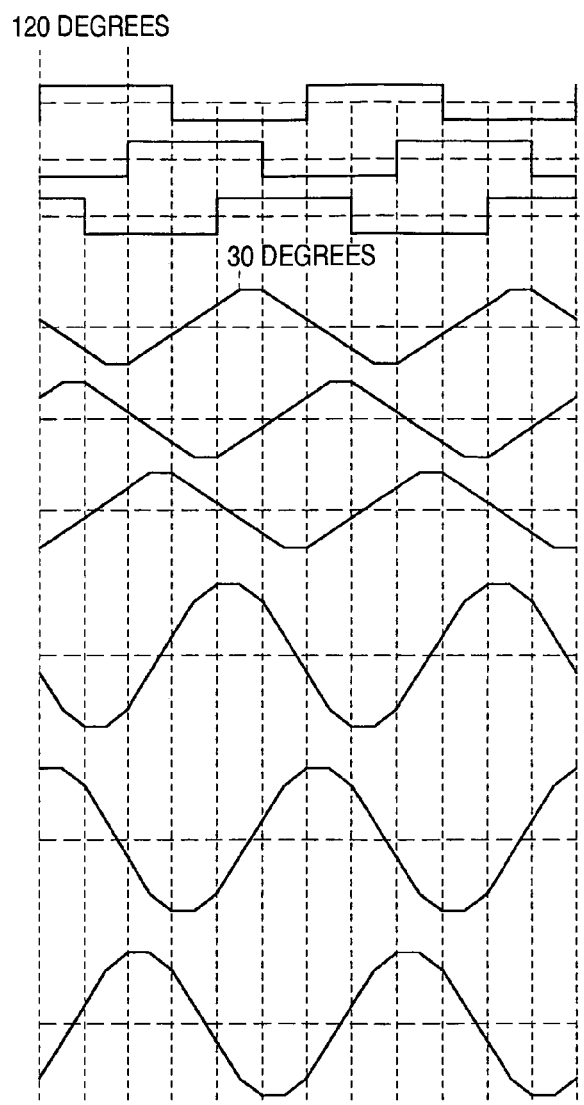
FIG. 10 is a diagram showing an example of operation waveforms of a modulation wave generator.

Waveforms at various points concerning the modulation wave generator 7 will now be described with reference to FIG. 10.

As shown in FIGS. 10(a) to (c), the second phase signals hsu, hsv and hsw are square wave signals having a phase difference of 120 degrees in electrical angle between each other. The trapezoidal wave signals tru, trv and trw shown in FIGS. 10(d) to (f) are trapezoidal wave signals having flat portions over a range of 30 degrees in electrical angle. The quasi-sinusoidal wave signals mu, mv and mw shown in FIGS. 10(g) to (i) are quasi-sinusoidal wave signals obtained by broken line approximation.

The trapezoidal wave signals tru, trv and trw are fixed in phase relatively to the second phase signals hsu, hsv and hsw. For example, a start time when a slope starts from a flat portion of the trapezoidal wave signal tru coincides with a rising edge or a falling edge of the second phase signal hsv. On the other hand, the amplitude of each trapezoidal wave signal is determined by the control signal VSP.

An internal configuration of the trapezoidal wave modulator 23 will now be described with reference to FIGS. 11 and 12.

Figure 11:
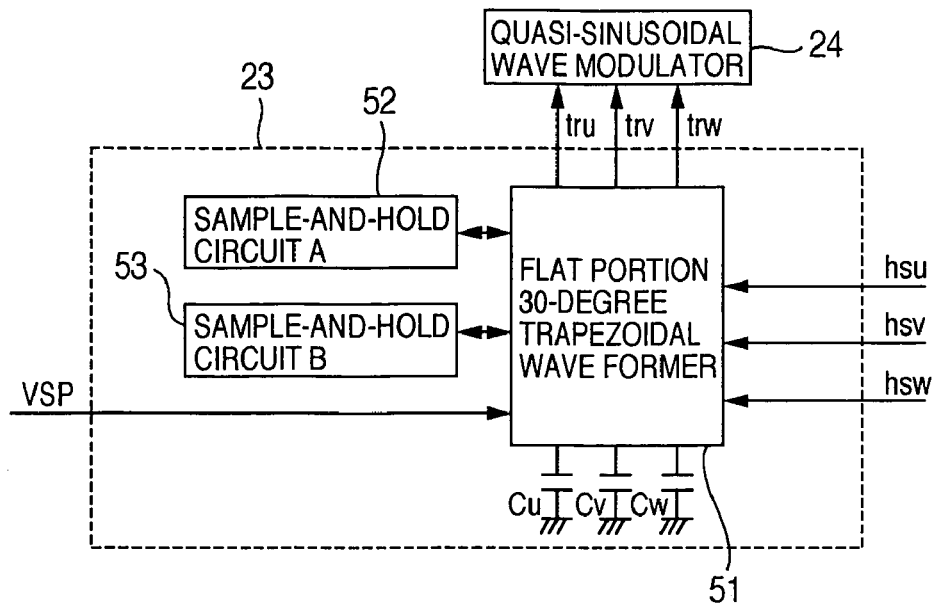
FIG. 11 is a diagram showing an example of a configuration of a trapezoidal wave modulator.

FIG. 11 shows a configuration of the trapezoidal wave modulator 23. The trapezoidal wave modulator 23 includes two sample-and-hold circuits 52 and 53 and three capacitors Cu, Cv and Cw around a flat portion 30-degree trapezoidal wave former 51.

The control signal VSP supplied from the speed control computation processor 8 and the second phase signals hsu, hsv and hsw are input to the flat portion 30-degree trapezoidal wave former 51.

The two sample-and-hold circuits 52 and 53 are used to hold certain voltage levels of the trapezoidal wave signals. The three capacitors are used to be charged and discharged from a constant current source (not illustrated) in the flat portion 30-degree trapezoidal wave former 51 to generate a modulation waveform having a flat portion 30-degree trapezoidal waveform.

Figure 12:
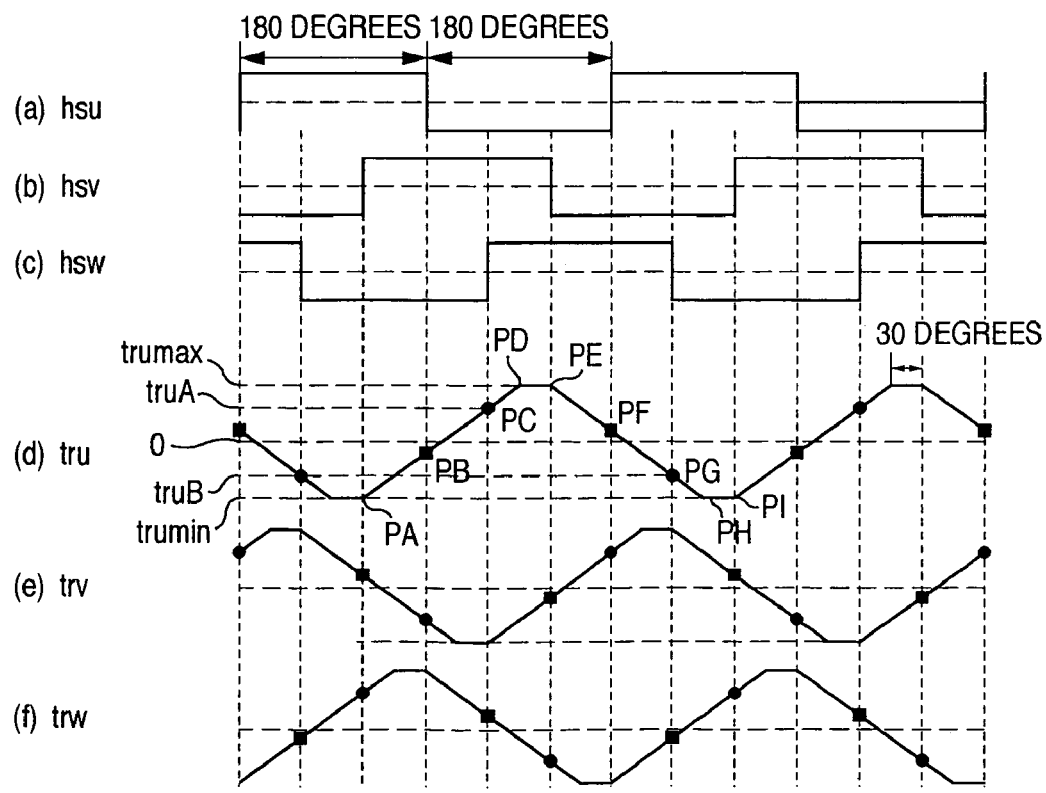
FIG. 12 is a diagram showing an example of waveforms at principal points in a trapezoidal wave modulator.

FIG. 12 shows waveforms at various points in the trapezoidal wave modulator 23 having the above-described configuration. Operation will now be described with reference to FIG. 12.

In the flat portion 30-degree trapezoidal wave former 51, charging of the U-phase capacitor Cu using the constant current source is started at, for example, timing PA of a rising edge of the second phase signal hsv to form a rising slope portion of the U-phase trapezoidal wave tru as shown in FIG. 12. A voltage value truA of the U-phase capacitor is taken into the sample-and-hold circuit A 52 at timing PC of a rising edge of the second phase signal hsw.

It is now assume in the ideal flat portion 30-degree trapezoidal wave that a middle magnitude between trumax, which is the magnitude of an upper flat portion of the trapezoidal wave, and trumin, which is the magnitude of a lower flat portion is a zero level. At that time, the upper limit value trumax, which is the maximum value of the trapezoidal wave, is found by using the relation trumax=truAx5/3. Therefore, trumax is previously generated on the basis of truA. Charging is stopped at time PD when the voltage at the U-phase capacitor Cu has become trumax, and the upper limit value trumax is held to form the upper flat portion of the trapezoidal wave.

Discharge of the U-phase capacitor Cu using the constant current source is started at timing PE of a falling edge of the second phase signal hsv to form a falling slope portion of the U-phase trapezoidal wave tru.

A voltage value truB of the U-phase capacitor is taken into the sample-and-hold circuit B 53 at timing PG of a falling edge of the second phase signal hsw. In the case of the ideal flat portion 30-degree trapezoidal wave, the lower limit value trumin, which is the minimum value of the trapezoidal wave, is found by using the relation trumin=truBx5/3. Therefore, trumin is previously generated on the basis of truB. Discharging is stopped at time PH when the voltage at the U-phase capacitor Cu has become trumin. And the lower limit value trumin is held until timing PI of a rising edge of the second phase signal hsv to form the lower flat portion of the trapezoidal wave.

The magnitude of the current of the constant current source for charging or discharging a capacitor is given in proportion to the control signal VSP. Accordingly, the gradient of the slope of the trapezoidal wave is in proportion to the control signal VSP. As a result, the amplitude of the trapezoidal wave is also in proportion to the control signal VSP.

For each of the V phase and W phase, a flat portion 30-degree trapezoidal wave is formed in the same way as the U phase. Thus, three-phase trapezoidal wave signals deviated from each other in phase by 120 degrees are formed.

An internal configuration of the quasi-sinusoidal wave modulator 24 will now be described with reference to FIGS. 13 and 14.

Figure 13:
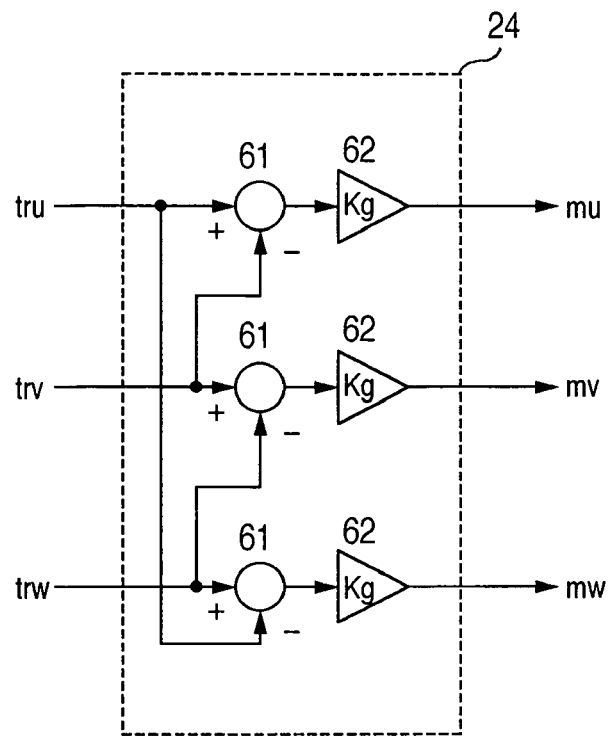
FIG. 13 is a diagram showing an example of a configuration of a quasi-sinusoidal wave modulator.

FIG. 13 shows a configuration of the quasi-sinusoidal wave modulator 24. The quasi-sinusoidal wave modulator 24 includes a subtracter 61 and an amplifier 62 having an amplification gain Kg, for each phase.

In other words, the quasi-sinusoidal wave signals mu, mv and mw are generated respectively on the basis of the flat portion 30-degree trapezoidal wave signals tru, trv and trw by using the subtracters 61 and the amplifiers 62 according to the following equations.

$$mu = Kg \times (tru - trv)$$

$$mv = Kg \times (trv - trw)$$

$$mw = Kg \times (trw - tru)$$

Here, Kg is a gain that determines the amplitude of each of the quasi-sinusoidal wave signals.

Figure 14:
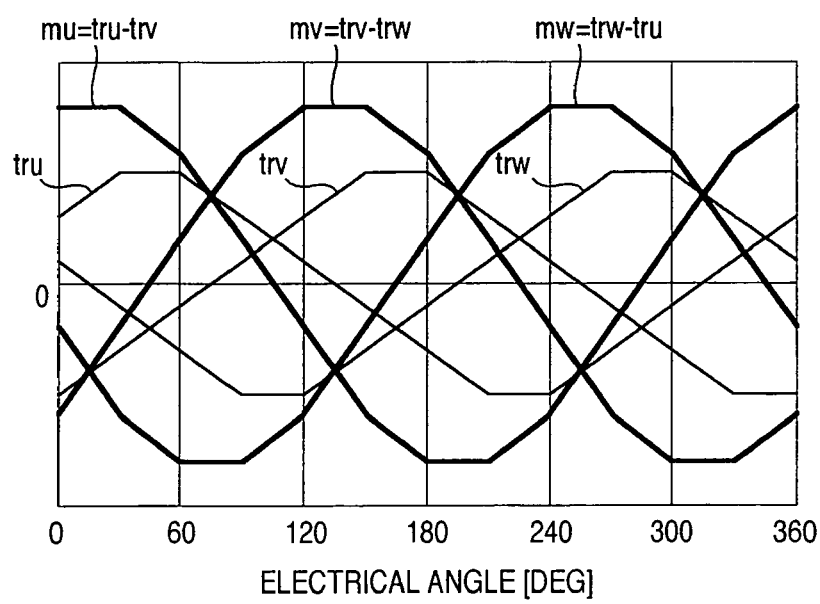
FIG. 14 is a diagram showing waveforms at principal points in a quasi-sinusoidal wave modulator.

FIG. 14 shows examples of waveforms at principal points in the quasi-sinusoidal wave modulator 24, and tru, trv and trw denote three-phase flat portion 30-degree trapezoidal waves. If Kg is set equal to Kg=1 in the expressions, mu, mv and mw become quasi-sinusoidal waves as shown in FIG. 14.

An operation example of the present embodiment will now be described with reference to FIGS. 15A–15C and FIGS. 16A–16C.

Figure 15A:
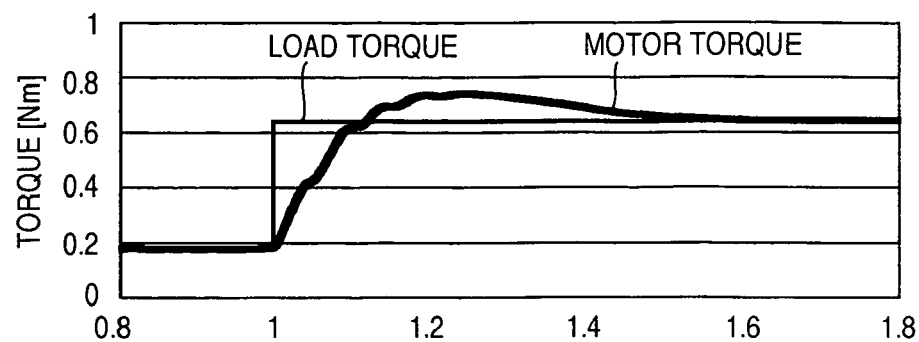
FIGS. 15A to 15C are diagrams showing an example of operation conducted when a second phase signal controller is not used.
Figure 15B:
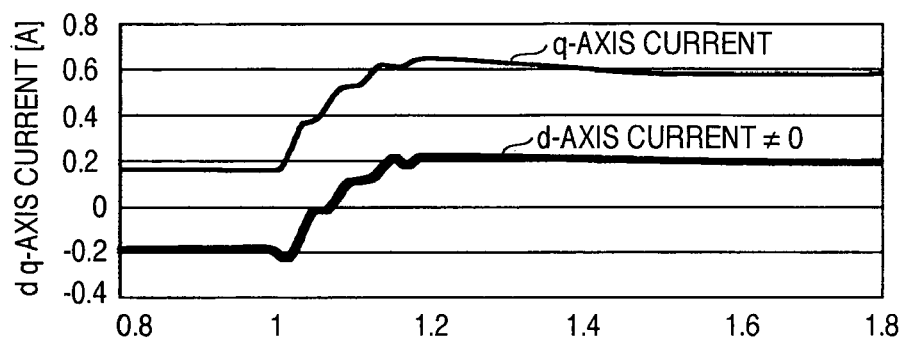
Figure 15C:
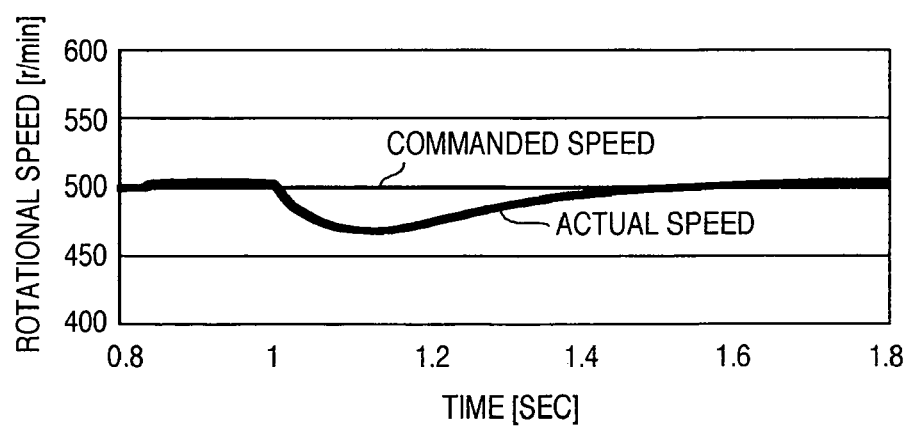
Figure 16A:
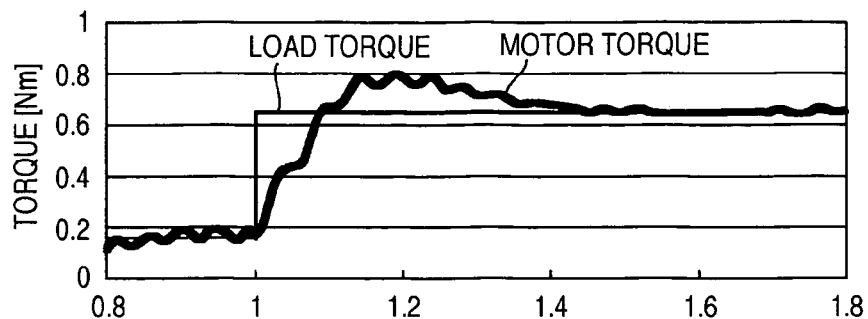
FIGS. 16A to 16C are diagrams showing an example of operation conducted when a second phase signal controller is used.
Figure 16B:
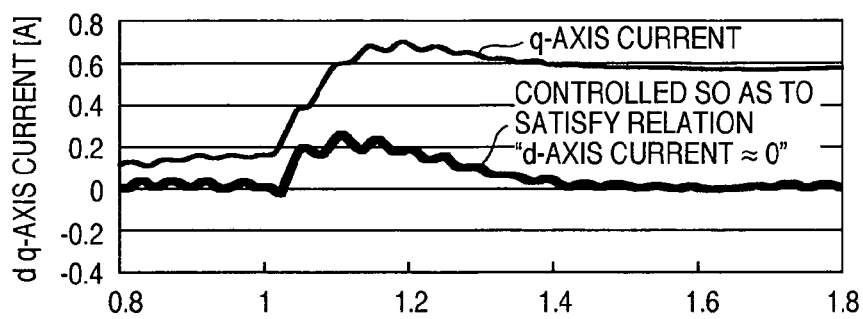
Figure 16C:
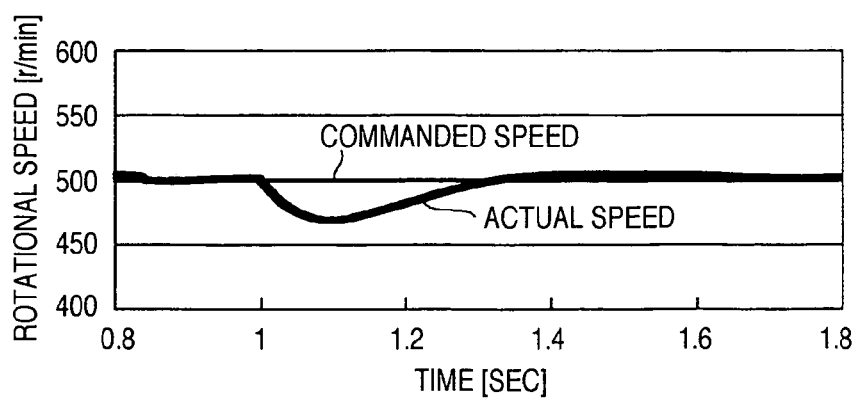

FIGS. 15A to 15C show an example of operation conducted in the case where the second phase signal controller 13 is not used. In this case, the first phase signals hu, hv and hw and the control signal VSP are input to the modulation wave generator 7, and on the basis of these signals the modulation wave signals mu, mv and mw are generated to drive the motor. FIGS. 16A to 16C show an example of operation conducted in the case where the second phase signal controller 13 is used to drive the motor according to the present embodiment. Both FIGS. 15A to 15C and FIGS. 16A to 16C show simulation results of operation when the load torque is suddenly changed at time of 1 second with the commanded rotational speed fixed to 500 r/min.

In the case where the second phase signal controller 13 is not used, a d-axis current obtained when the motor current in the uvw coordinate system is converted to the dq coordinate system changes from negative values to positive values in response to a load change as shown in FIG. 15B. They are far from zero, and it is appreciated that the induced voltage is deviated in phase from the current. Therefore, the drive efficiency falls.

On the other hand, in the case where the second phase signal controller 13 is used, the d-axis current obtained when the motor current in the uvw coordinate system is converted to the dq coordinate system leaves zero somewhat immediately after the load change as shown in FIG. 16B. However, the d-axis current is approximately zero steadily. Therefore, it is appreciated that control is exercised so as to square the induced voltage in phase with the current. Therefore, driving at high efficiency becomes possible.

Figure 17A:
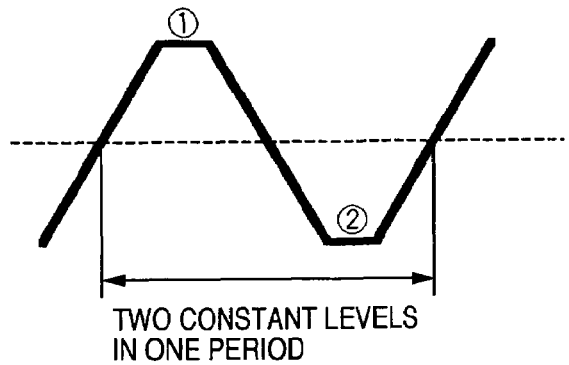
FIGS. 17A and 17B are diagrams showing examples of a shape of a trapezoidal wave wave.

In the present embodiment, a three-phase trapezoidal wave having two constant levels in a period as shown in FIG. 17A has been exemplified. Since this waveform has few breaking points, the voltage waveform changes smoothly and the torque ripple caused by breaking points can be reduced.

Figure 17B:
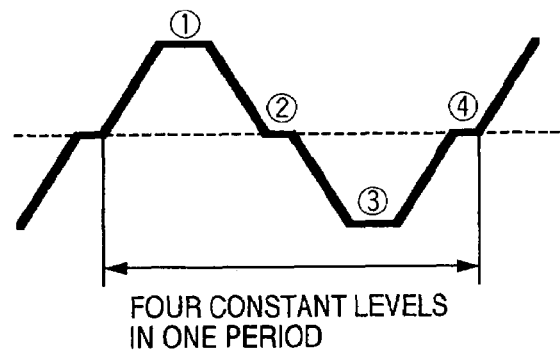

The shape of the trapezoidal wave may be a three-phase trapezoidal wave having more than two constant levels in a period. For example, a trapezoidal wave having four constant levels in a period as shown in FIG. 17B is also incorporated in the present invention.

Second Embodiment

A second embodiment according to the present invention will now be described with reference to FIGS. 18 to 20.

Figure 18:
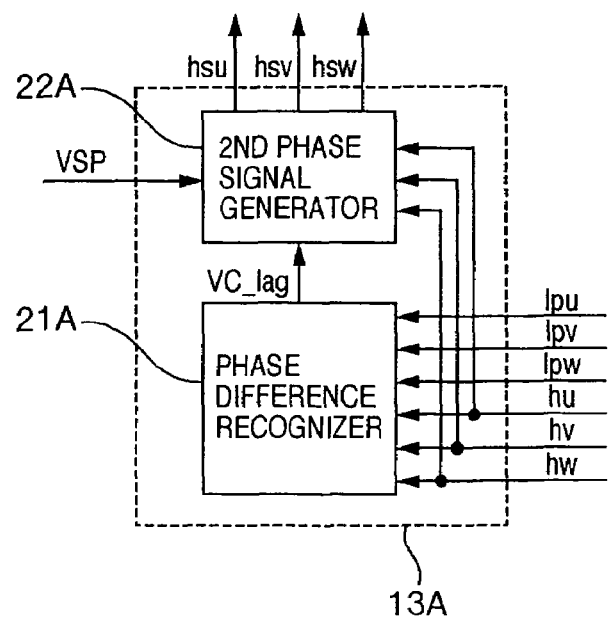
FIG. 18 is a configuration diagram of a second phase signal controller in a second embodiment.
Figure 19:
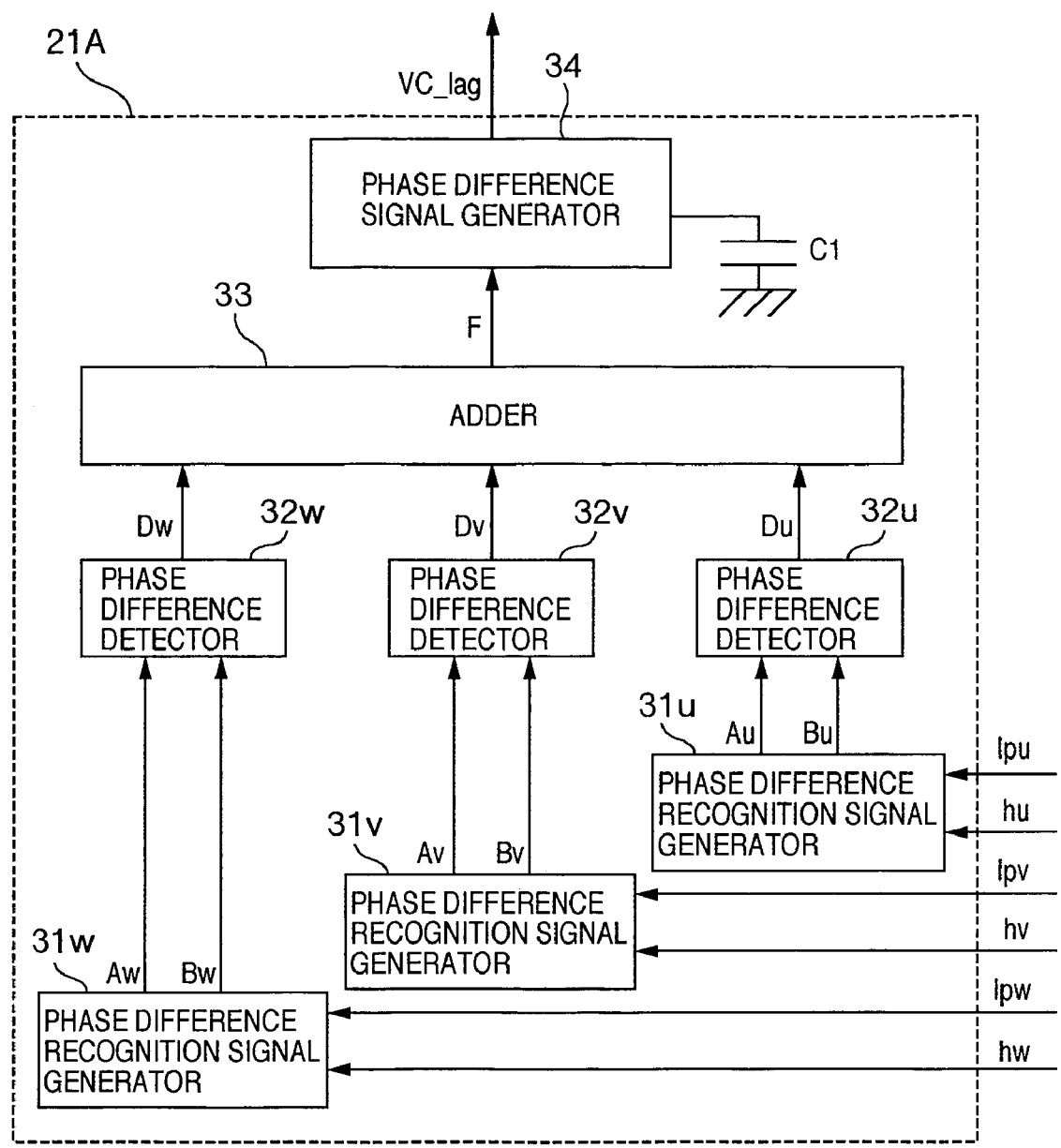
FIG. 19 is a configuration diagram of a phase difference recognizer in a second embodiment.

In the second embodiment, the second phase signal controller 13 in the first embodiment is replaced by a second phase signal controller 13A shown in FIG. 18. Except this, the second embodiment has the same configuration as that shown in FIG. 1. An internal configuration of the second phase signal controller 13A in the second embodiment will now be described with reference to FIG. 18.

The second phase signal controller 13 includes a phase difference recognizer 21A and a second phase signal generator 22A. The second phase signal controller 13A greatly differs from the second phase signal controller 13 in that the control signal VSP is not input to the phase difference recognizer 21A, but input to the second phase signal generator 22A.

The first phase signals hu, hv and hw and the current polarity signals Ipu, Ipv and Ipw are input to the phase difference recognizer 21A. The phase difference recognizer 21A recognizes the magnitudes of phase differences between the first phase signals and the current polarity signals, and the lead/lag relations, and outputs the phase difference signal VC_lag.

The control signal VSP, the first phase signals hu, hv and hw, and the phase difference signal VC_lag are input to the second phase signal generator 22A. On the basis of the rotational speed of the motor and the phase difference signals, the second phase signal generator 22A outputs the second phase signals hsu, hsv and hsw that are made to be the same as or to lead in phase the first phase signals.

An internal configuration of the phase difference recognizer 21A in the second embodiment will now be described with reference to FIG. 19. FIG. 19 shows a configuration of the phase difference recognizer 21A. The phase difference recognizer 21A differs from the phase difference recognizer 21 in that the control signal VSP is not input thereto. Therefore, the phase difference signal VC_lag does not contain the rotational speed information of the motor.

An internal configuration of the second phase signal generator 22 in the second embodiment will now be described with reference to FIG. 20. FIG. 20 shows a configuration of the second phase signal generator 22A. the second phase signal generator 22A differs from the second phase signal generator 22 in that the control signal VSP is input thereto and a phase difference/speed information signal generator 47 is included. In the present embodiment, the phase difference signal VC_lag output from the phase difference recognizer 21A does not contain the rotational speed information of the motor as described above. On the basis of the control signal VSP and the phase difference signal VC_lag, therefore, the phase difference/speed information signal generator 47 generates a new phase difference signal VC_lag having the rotational speed information as well by conducting addition or multiplication.

In the present embodiment, the control signal VSP is input to the phase difference/speed information signal generator 47. Alternatively, the control signal VSP may be input to the distributor 41, the charge & discharge signal generator 42, or the slope signal generators 44u, 44v and 44w of respective phases. In other words, finally the control signal VSP, i.e., the rotational speed information of the motor should be reflected in the slope signals of respective phases.

Figure 20:
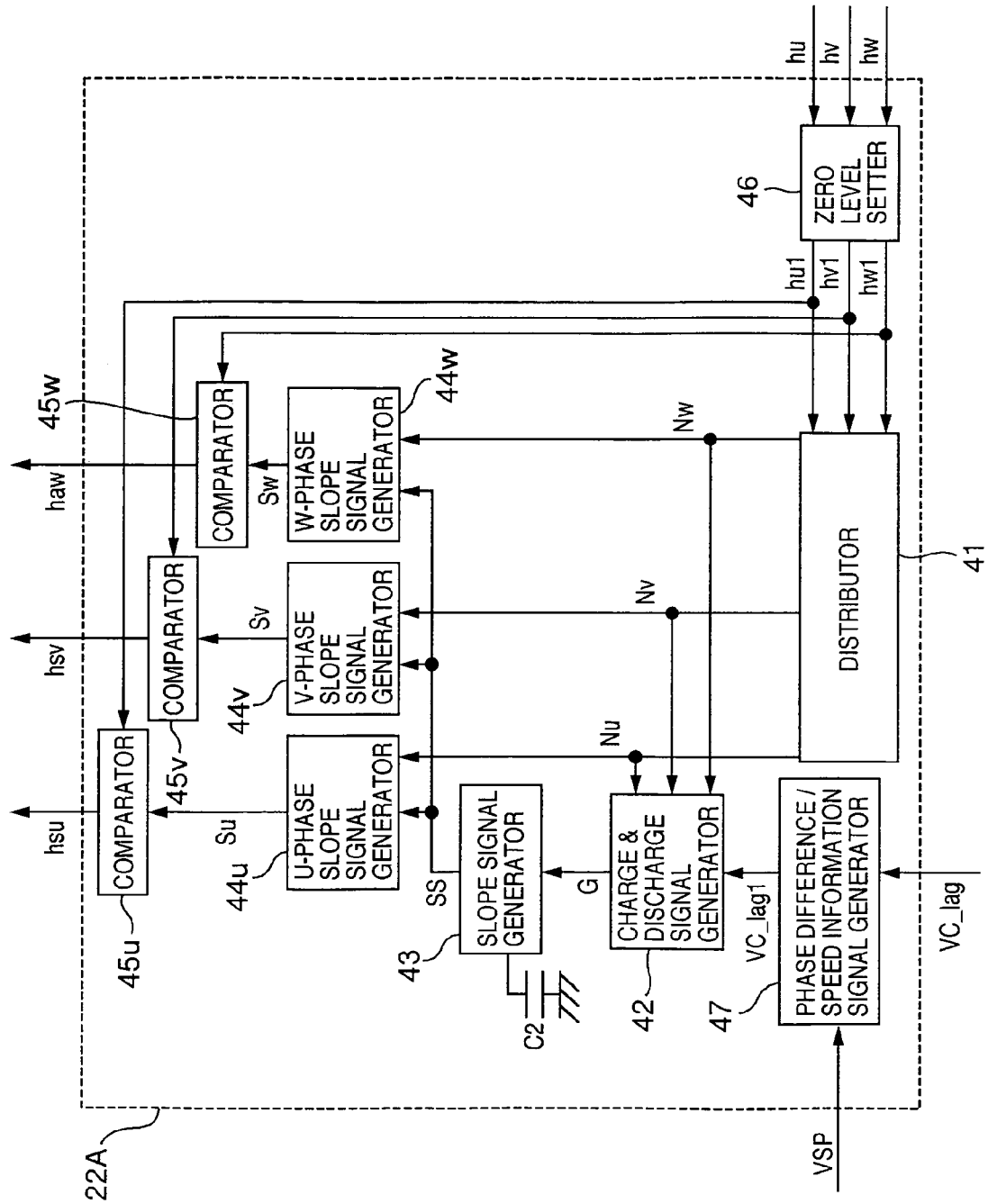
FIG. 20 is a configuration diagram of a second phase signal generator in a second embodiment.

When the rotational speed information is not necessary for the voltage phase control, such as when the motor is run at a constant rotational speed, the control signal VSP may not be input to any component shown in FIG. 20.

Third Embodiment

A third embodiment of the present invention will now be described with reference to FIGS. 21 and 22.

Figure 21:
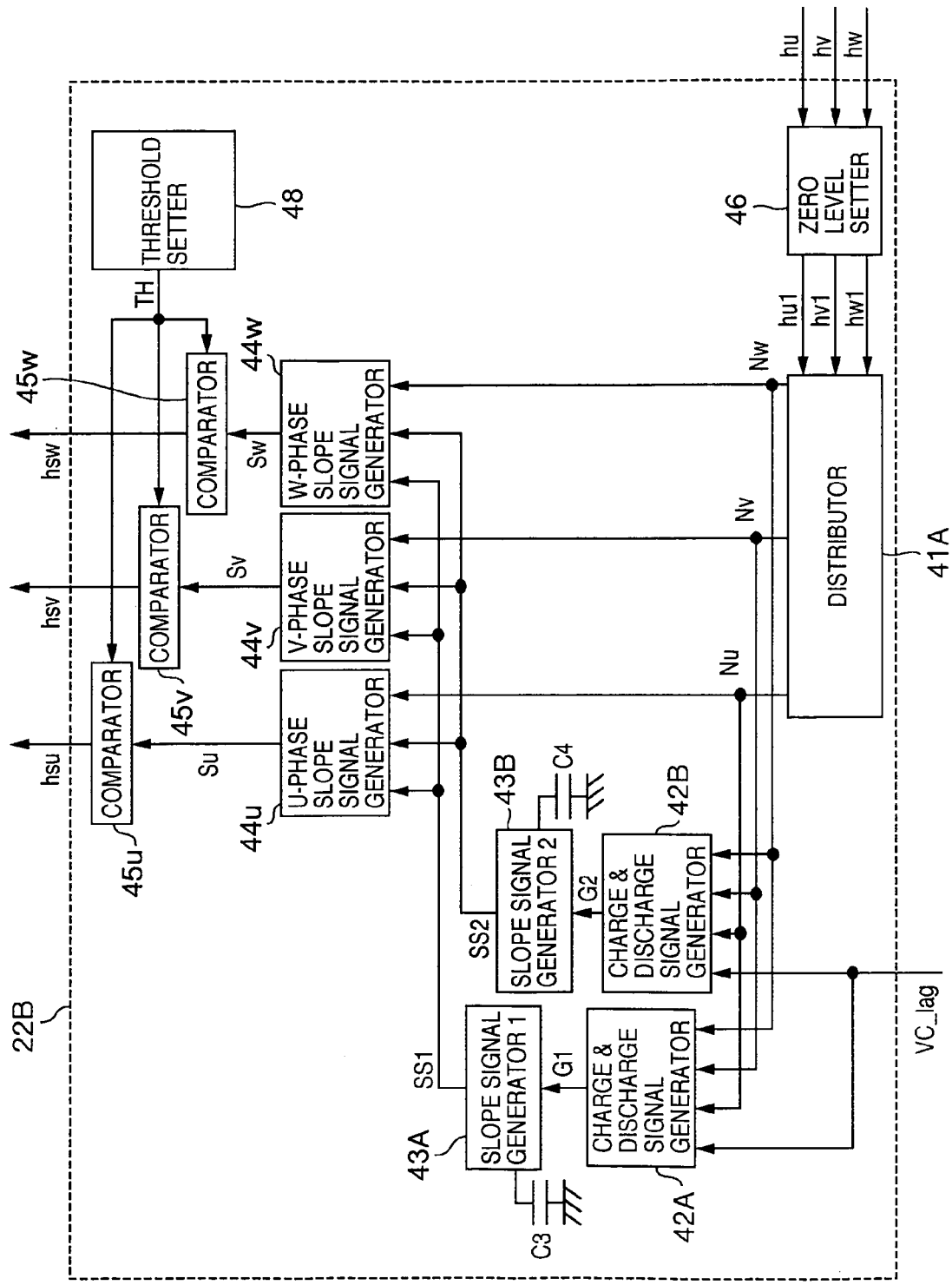
FIG. 21 is a configuration diagram of a second phase signal generator in a third embodiment.

In the third embodiment, the second phase signal generator 22 in the first embodiment is replaced by a second phase signal generator 22B shown in FIG. 21. Except this, the third embodiment has the same configuration as that shown in FIGS. 1 and 3.

An internal configuration of the second phase signal controller 22B in the third embodiment will now be described with reference to FIGS. 21 and 22.

FIG. 21 shows a configuration of the second phase signal generator 22B. The second phase signal generator 22B differs from the second phase signal generator 22 in that the number of charge & discharge signal generators is increased to two (42A and 42B), the number of slope signal generators is increased to two (43A and 43B), the number of capacitors is increased to two (C3 and C4), and a threshold setter 48 is included.

FIG. 22 shows an example of operation waveforms of the second phase signal generator 22B.

The first phase signals hu, hv and hw are input to the zero level setter 46. As shown in FIGS. 22(a) to (c), the zero level setter 46 outputs the new first phase signals hu1, hv1 and hw1 having a middle value as the zero level.

The new first phase signals hu1, hv1 and hw1 are input to a distributor 41A. A subtracter (not illustrated) in the distributor 41A outputs mask signals Nu, Nv and Nw shown in FIGS. 22(d) to (f) on the basis of following relational expressions.

$$Nu=hv1-hw1$$

$$Nv=hw1-hu1$$

$$Nw=hu1-hv1$$

The mask signals Nu, Nv and Nw and the phase difference signal VC_lag output from the phase difference recognizer 21 are input to the charge & discharge signal generators 42A and 42B. While successively switching phases respectively in which the mask signals Nu, Nv and Nw assume positive values, the charge & discharge signal generator 42A outputs a charge & discharge signal G1 having discontinuous portions every 120 degrees as shown in FIG. 22(g). While successively switching phases respectively in which the mask signals Nu, Nv and Nw assume negative values, the charge & discharge signal generator 42B outputs a charge & discharge signal G2 having discontinuous portions every 120 degrees as shown in FIG. 22(h). In both the charge & discharge signals G1 and G2, the amplitude is proportionate to VC_lag.

The charge & discharge signal G1 is input to the slope signal generator 1 43A. A capacitor C3 connected to the slope signal generator 1 43A is charged to a positive voltage from a constant current source (not illustrated) in the slope signal generator 1 43A on the basis of the charge & discharge signal G1. The charge & discharge signal G1 is thus integrated to generate slope portions of a positive slope signal SS1 having a gradient proportionate to the phase difference signal VC_lag shown in FIG. 22(i). On the other hand, charges across the capacitor C3 are discharged to a zero level instantaneously in the discontinuous portions of the charge & discharge signal G1 to start the next slope from the zero level.

The charge & discharge signal G2 is also input to the slope signal generator 2 43B in the same way. A capacitor C4 connected to the slope signal generator 2 43B is charged to a negative voltage from a constant current source (not illustrated) in the slope signal generator 2 43B on the basis of the charge & discharge signal G2. The charge & discharge signal G2 is thus integrated to generate slope portions of a negative slope signal SS2 having a gradient proportionate to the phase difference signal VC_lag shown in FIG. 22(j). Charges across the capacitor C4 are discharged to the zero level instantaneously in the discontinuous portions of the charge & discharge signal G2 to start the next slope from the zero level.

The positive slope signal SS1, the negative slope signal SS2, and the mask signals Nu, Nv and Nw are input to the slope signal generators 44u, 44v and 44w of respective phases. The slope signal generators 44u, 44v and 44w output slope signals Su, Sv and Sw of respective phases by masking the positive and negative slope signals SS1 and SS2 while the mask signals Nu, Nv and Nw of respective phases are at the zero level, respectively.

The slope signals Su, Sv and Sw and a threshold signal TH generated by the threshold setter 48 are input to the comparators 45u, 45v and 45w of respective phases, respectively. The comparators 45u, 45v and 45w output the second phase signals hsu, hsv and hsw, respectively.

By taking the U phase as an example, operation conducted when the second phase signal leads in phase the first phase signal (case 1) and operation conducted when the second phase signal lags in phase the first phase signal (case 2) will now be described.

If the U-phase slope signal has a waveform as shown in FIG. 22(k), superposition of the U-phase slope signal on the threshold yields intersections indicated by black circles in FIG. 22(l). If the signal is inverted at the intersection, the second phase signal as represented by a solid line in FIG. 22(l) is generated and the second phase signal can be made to lead in phase the new first phase signal as indicated by t1 to t4.

On the other hand, if the U-phase slope signal has a waveform as shown in FIG. 22(m), superposition of the U-phase slope signal on the threshold yields intersections indicated by black circles in FIG. 22(n). If the signal is inverted at the intersection, the second phase signal as represented by a solid line in FIG. 22(n) is generated and the second phase signal can be made to lead in phase the new first phase signal as indicated by t5 to t7. In the present embodiment, the threshold TH is set equal to an arbitrary constant value.

According to the present embodiment, each of the second phase signals can be made to lead the first phase signal of the phase by an electrical angle in the range of approximately 0 to 60 degrees or lag the first phase signal of the phase by an electrical angle in the range of approximately 0 to −60 degrees, as heretofore described.

In the foregoing embodiments, the new first phase signal hu1, hv1 or hw1 or the output TH of the threshold setter is used as the threshold, and its level is set to a fixed value. Therefore, the second phase signals hsu, hsv and hsw are generated by changing the gradient of the slope signal in proportion to the phase difference signal VC_lag generated on the basis of the phase difference information between the first phase signal and the current polarity signal and the rotational speed information of the motor, and moving the phase of the intersection between the slope signal and the threshold forward or backward. However, the relation between the slope signal and the threshold is relative, and either of them may be changed. In other words, in contrast with the foregoing embodiments, the second phase signal may be generated by fixing the gradient of the slope signal and changing the level of the threshold. In that case, it is preferable to generate the level of the threshold in proportion to the phase difference signal VC_lag in order to provide the phase difference information between the first phase signal and the current polarity signal and the rotational speed information of the motor.

In the foregoing embodiments, the control circuit 10 and the inverter 3 are formed on a monolithic IC to attain a single chip configuration. By doing so, wiring between the control circuit and the inverter becomes unnecessary and the influence of external noise can be reduced. Furthermore, since the control circuit and the inverter are incorporated in a shingle chip, construction of a motor drive system (motor+inverter+control circuit) is facilitated.

In the foregoing embodiments, IC components are incorporated in the motor. By doing so, it becomes possible to reduce the size of the whole motor drive system. Furthermore, wiring between the motor and the inverter becomes short, and the influence of the external noise can be reduced.

In the foregoing embodiments, the control circuit 10 and the inverter 3 are formed on a monolithic IC to attain a single chip configuration. Alternatively, the control circuit 10 and the inverter 3 may be respectively formed on individual monolithic ICs in a dual chip configuration. By using the dual chip configuration, it is possible to make the scale of the control circuit large, or provide more sophisticated control function or additional function by using a digital circuit and a micro computer in the control circuit.

In the foregoing embodiments, a method of using an analog circuit to, for example, charge and discharge the capacitor has been described. Alternatively, operation similar to that in the foregoing embodiments may be conducted by using a digital circuit and a microcomputer.

Figure 23:
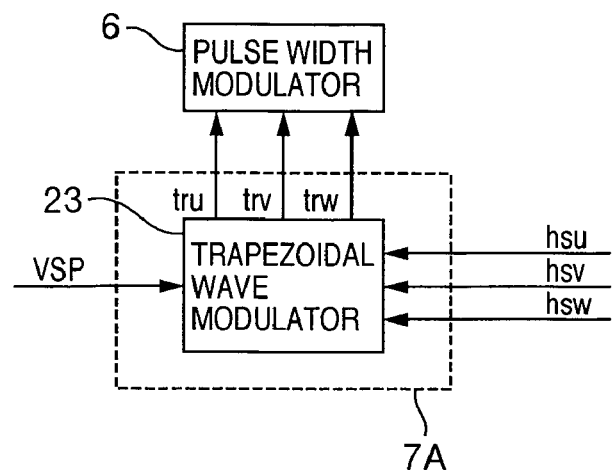
FIG. 23 is a configuration diagram showing another example of a modulation wave generator.

Instead of the modulation wave generator 7 used in the foregoing embodiments, a modulation wave generator 7A shown in FIG. 23 may be used. In the modulation wave generator 7A, the quasi-sinusoidal wave modulator 24 is removed and only the trapezoidal modulator 23 is included to make the circuit scale of the modulation wave generator.

Therefore, the trapezoidal wave signals tru, trv and trw output from the trapezoidal wave modulator 23 are input directly to the pulse width modulator 6, and compared with the carrier wave to generate PWM signals.

In general, a line-to-line voltage is applied to a motor winding. Even if the waveform energizing each phase is a trapezoidal wave, therefore, a voltage having a quasi-sinusoidal waveform obtained by conducting subtraction on trapezoidal waves, between phases is actually applied. Denoting three phases of trapezoidal waves by tru, trv and trw, line-to-line voltages become tru-trv, trv-trw and trw-tru, and the quasi-sinusoidal waves mu, mv and mw shown in FIG. 14 are applied to the motor. Even if the modulation waves of respective phases remain trapezoidal waves, therefore, a torque ripple reducing effect nearly equivalent to that obtained when respective phases are energized by quasi-sinusoidal waves is obtained.

Figure 24:
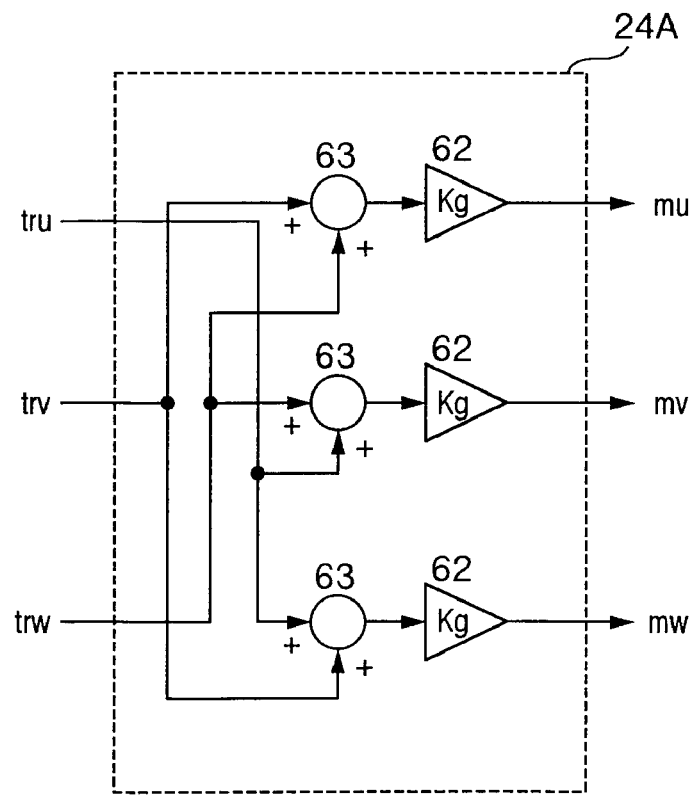
FIG. 24 is a configuration diagram showing another example of a quasi-sinusoidal wave modulator.

In the modulation wave generator 7, the quasi-sinusoidal wave modulator 24 may be replaced by a quasi-sinusoidal wave modulator 24A shown in FIG. 24. The quasi-sinusoidal wave modulator 24 includes an adder 63 and an amplifier 62 having an amplification gain Kg, for each phase.

The quasi-sinusoidal wave modulator 24A obtains quasi-sinusoidal wave signals by finding sum signals between respective phases of the flat portion 30-degree trapezoidal wave signals according to the following equations.

$$mu = Kg \times (trv + trw)$$

$$mv = Kg \times (trw + tru)$$

$$mw = Kg \times (tru + trv)$$

Figure 25:
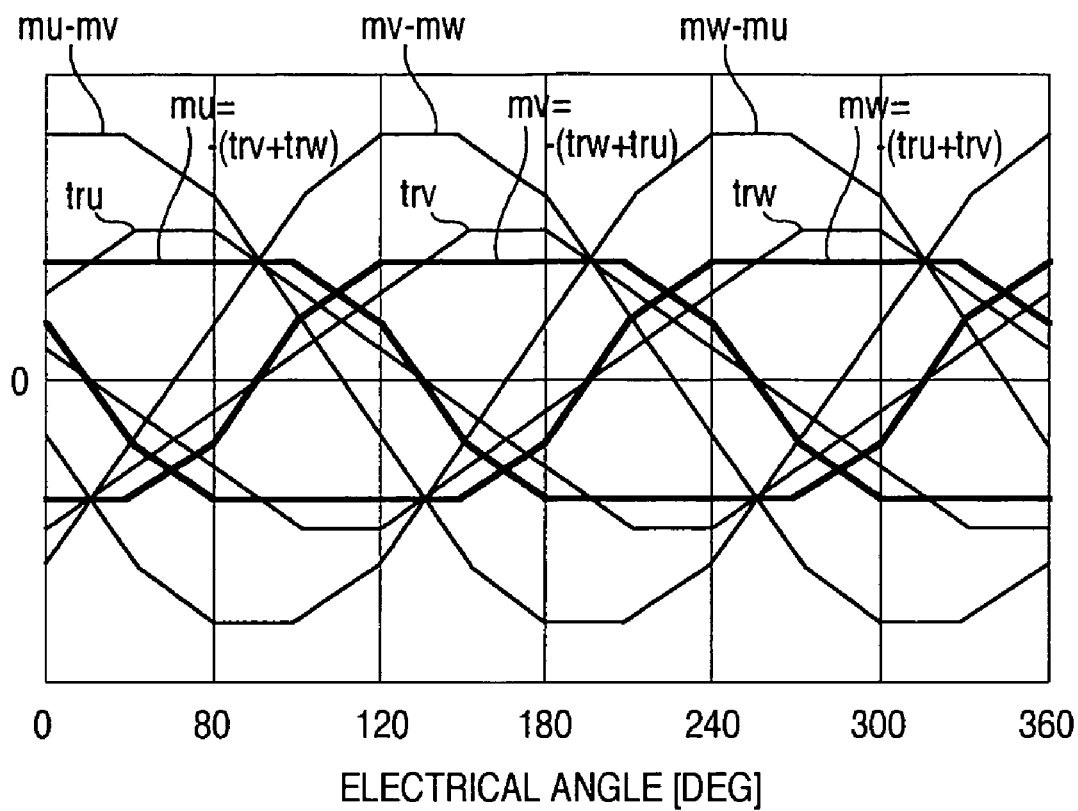
FIG. 25 is a diagram showing waveforms at principal points in another example of a sinusoidal wave modulator.

Waveforms obtained in this case are shown in FIG. 25, where tru, trv and trw are three-phase flat portion 30-degree trapezoidal waves. If Kg is set equal to Kg=−1 in the expressions, each of mu, mv and mw becomes a quasi-sinusoidal wave A having the same phase as the trapezoidal wave of the phase, an amplitude smaller than that of the trapezoidal wave of the phase, and a flat portion longer than that of the trapezoidal wave of the phase.

As a matter of fact, line-to-line voltages are applied to the motor windings as described above. Therefore, voltages each having a quasi-sinusoidal waveform obtained by conduction the subtraction on the quasi-sinusoidal waves A having long flat portions, such as mu-mv, mv-mw and mw-mu shown in FIG. 25 are applied to the motor. These voltages coincide with the quasi-sinusoidal waves shown in FIG. 14. If the sum signals between phases of the flat portion 30-degree trapezoidal wave signals are derived, the PWM signals can be generated by comparing the quasi-sinusoidal waves A (mu, mv and mw) having amplitudes smaller than those of the trapezoidal waves tru, trv and trw of respective phases with the carrier wave signal to obtain the same quasi-sinusoidal waves. Therefore, the utilization factor of DC voltage can be made higher. In other words, the magnitude of the DC voltage required to obtain the same motor voltage can be made lower.

In the foregoing embodiments, the quasi-sinusoidal wave signals output from the quasi-sinusoidal wave modulator 24 or the quasi-sinusoidal wave modulator 24A, and the trapezoidal wave signals output from the trapezoidal wave modulator 23 are input to the pulse width modulator 6. Alternatively, they may be input to the pulse width modulator 6 after they are smoothed in waveform in a filter circuit such as an RC filter. Or sinusoidal waves may be used instead of the quasi-sinusoidal waves or trapezoidal waves. By doing so, the waveform distortion factor can be further reduced.

According to the present invention, the waveform distortion factor can be made extremely small, and the motor can be driven at high efficiency even when the rotational speed or the load of the motor has changed as heretofore described.

Furthermore, a large torque can be output at a small current. When the rotational speed or the load of the motor has changed, therefore, it can be followed rapidly.

By using an analog circuit having such a withstand voltage that the analog circuit can be mounted on the same chip as the inverter elements, the phase control conducted by a microcomputer in the conventional technique can be conducted by using a control circuit formed on a monolithic IC on which the inverter is formed, as one body. As a result, the load on a computation processing apparatus such as a microcomputer that conducts various kinds of control or status monitoring in the motor drive system can be lightened. Therefore, a small-sized or inexpensive computation processing apparatus can be used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of AC motors, comprising:
    a second phase signal controller for generating second phase signals so as to make phase differences between first phase signals generated by a first phase signal generator and current polarity signals of an AC motor driven by an inverter generated by a current polarity detector approach zero, on the basis of the phase differences and a command signal depending upon a rotational speed of the AC motor;
    a modulation wave generator for generating a plurality of modulation wave signals on the basis of the command signal depending upon the rotational speed of the AC motor and the second phase signals; and
    a pulse width modulator for comparing the modulation wave signals with a carrier wave signal and thereby conducting pulse width modulation control on the inverter.

2. A control apparatus of AC motors according to claim 1, wherein said second phase signal controller comprises:
- a phase difference recognizer for generating a phase difference signal on the basis of the phase differences and the command signal; and
- a second phase signal generator for generating the second phase signals so as to make the phase differences approach zero on the basis of the phase difference signal and the first phase signals.

3. A control apparatus of AC motors according to claim 2, wherein
- said phase difference recognizer integrates a phase difference recognition signal generated on the basis of the phase differences and the command signal, and
- generates the phase difference signal on the basis of a value obtained by the integration.

4. A control apparatus of AC motors according to claim 2, wherein
- said second phase signal generator integrates the phase difference signal to generate a slope signal, and
- generates the second phase signals on the basis of the slope signal and a threshold.

5. A control apparatus of AC motors according to claim 1, wherein said modulation wave generator comprises a trapezoidal wave modulator for generating a plurality of signals each having a trapezoidal waveform, the trapezoidal waveform having at least two constant levels in time of one period.

6. A control apparatus of AC motors according to claim 1, wherein said modulation wave generator comprises:
- a trapezoidal wave modulator for generating a plurality of signals each having a trapezoidal waveform, the trapezoidal waveform having at least two constant levels in time of one period; and
- a quasi-sinusoidal wave modulator for generating a plurality of quasi-sinusoidal wave signals on the basis of differences between the trapezoidal waveform signals.

7. A control apparatus of AC motors according to claim 1, wherein said modulation wave generator comprises:
- a trapezoidal wave modulator for generating a plurality of signals each having a trapezoidal waveform, the trapezoidal waveform having at least two constant levels in time of one period; and
- a quasi-sinusoidal wave modulator for generating a plurality of quasi-sinusoidal wave signals on the basis of sums between the trapezoidal waveform signals.

8. A dual chip inverter comprising:
- a first semiconductor chip having said control apparatus of AC motors according to claim 1; and
- a second semiconductor chip having an inverter supplied with a DC voltage to output an AC voltage.

9. A single chip inverter comprising:
- an inverter supplied with a DC voltage to output an AC voltage; and
- a control apparatus of AC motors, said control apparatus comprising:
- a current polarity detector for generating current polarity signals of an AC motor driven by the AC voltage;
- a second phase signal controller for generating second phase signals so as to make phase differences between first phase signals generated by a first phase signal generator and the current polarity signals approach zero, on the basis of the phase differences and a command signal depending upon a rotational speed of the AC motor;
- a modulation wave generator for generating a plurality of modulation wave signals on the basis of the command signal and the second phase signals; and
- a pulse width modulator for comparing the modulation wave signals with a carrier wave signal and thereby conducting pulse width modulation control on the inverter.

* * * * *